(12) United States Patent
Chornenky

(10) Patent No.: US 11,483,123 B2
(45) Date of Patent: Oct. 25, 2022

(54) DIRECT CONVERSION RECEIVER USING COHERENT INTEGRATION

(71) Applicant: NOKOMIS, INC., Canonsburg, PA (US)

(72) Inventor: Todd Eric Chornenky, Carmichaels, PA (US)

(73) Assignee: NOKOMIS, INC, Canonsburg, PA (US)

( * ) Notice: Subject to any disclaimer, the term of this patent is extended or adjusted under 35 U.S.C. 154(b) by 0 days.

(21) Appl. No.: 17/020,321

(22) Filed: Sep. 14, 2020

(65) Prior Publication Data

US 2021/0105036 A1    Apr. 8, 2021

Related U.S. Application Data

(60) Provisional application No. 62/900,046, filed on Sep. 13, 2019.

(51) Int. Cl.
*H04L 7/00*     (2006.01)
*H04B 17/336*   (2015.01)
*H04B 1/16*     (2006.01)

(52) U.S. Cl.
CPC ............ *H04L 7/0012* (2013.01); *H04B 1/16* (2013.01); *H04B 17/336* (2015.01); *H04L 7/0037* (2013.01)

(58) Field of Classification Search
CPC ... H04L 7/0012; H04L 7/0037; H04L 7/0008; H04B 1/16; H04B 17/336; H04B 7/22; H04W 56/001; H04W 56/0035
See application file for complete search history.

(56) References Cited

U.S. PATENT DOCUMENTS

| 2013/0136154 A1* | 5/2013 | Chomal ............... H04B 1/709 375/136 |
| 2017/0023632 A1* | 1/2017 | Johnson ............... G01R 31/007 |
| 2018/0254928 A1* | 9/2018 | Chu ................... H04L 25/03165 |

OTHER PUBLICATIONS

F. Rivet, Y. Deval, D. Dallet, JB. Begueret and D. Belot, "A Disruptive Software-Defined Radio Receiver Architecture Based on Sampled Analog Signal Processing," in Proc. IEEE RFIC, Honolulu, USA, pp. 197-200, Jun. 2007.

(Continued)

*Primary Examiner* — Yuwen Pan
*Assistant Examiner* — Fatuma G Sherif

(57) ABSTRACT

A receiver includes a circuit designed to process, based on a plurality of timed waveform reference locations, a waveform signal, the waveform signal comprising a message. The circuit may include a clock source, an input configured to receive the waveform signal, a time location reference circuit coupled to the clock source, the time location reference circuit designed to output the plurality of timed waveform reference locations, each timed waveform reference location being set by the clock, and a signal processing circuit coupled to the time location reference circuit, the signal processing circuit designed to generate an output voltage in a response to the waveform signal being inputted into the signal processing circuit through the input and processed at each timed waveform reference location from the series of timed waveform reference locations. A transmitter that generates the waveform signal can be also provided where the clocks are matched.

22 Claims, 29 Drawing Sheets

(56) References Cited

OTHER PUBLICATIONS

F. Rivet, Y. Deval, D. Dallet, JB. Begueret, P. Cathelin and D. Belot, "A Disruptive Receiver Architecture Dedicated To Software Defined Radio," in IEEE TCAS-II, vol. 55, n4, pp. 344-348, Apr. 2008. Show Context View Article Full Text: PDF (359KB) Google Scholar.
F. Rivet, Y. Deval, JB. Begueret, D. Dallet, P. Cathelin and D. Belot, "From Software-Defined to Software Radio Analog Signal Processor Features," in Proc. IEEE RWS'09, San Diego, USA, Jan. 2009.
F. Rivet, Y. Deval, D. Dallet, JB. Begueret and D. Belot, "65nm CMOS Circuit Design of a Sampled Analog Signal Processor dedicated to RF Applications," in Proc. IEEE NEWCAS'08, Montreal, Quebec, pp. 233-236, Jun. 2008.

* cited by examiner

Time Coherence Integration Operation of a N-Second Bit Signal

8-Tap Time-Coherence Integrated Bit Signal

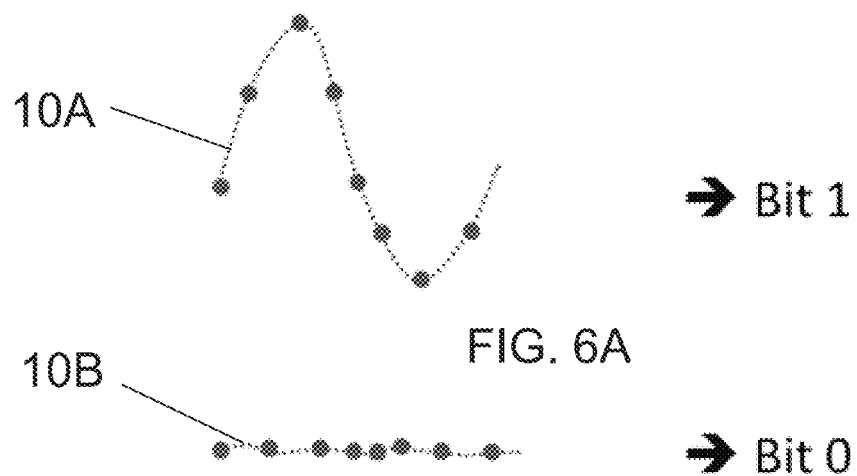
FIG. 6A
FIG. 6B
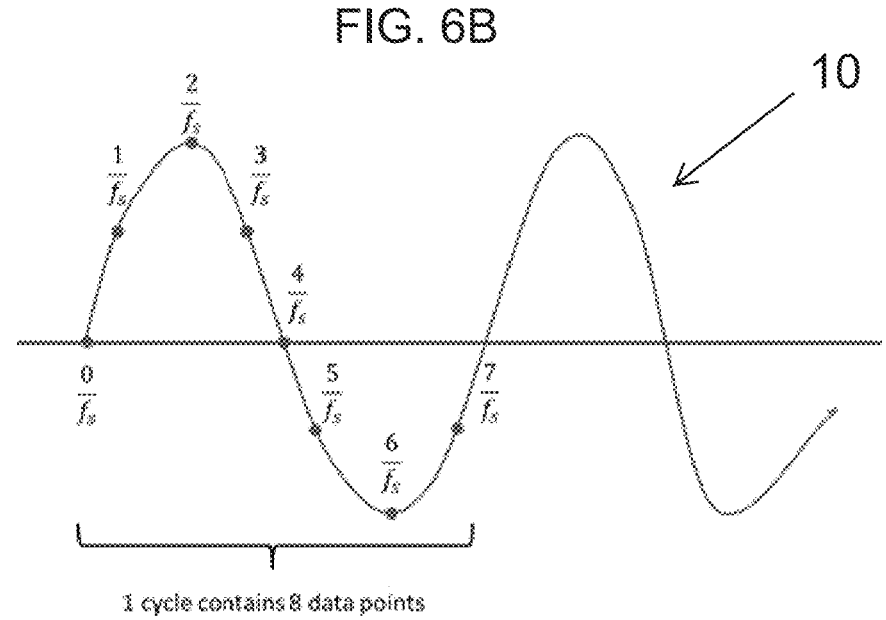
FIG. 7

Section of above BWCs seen inside a BDP

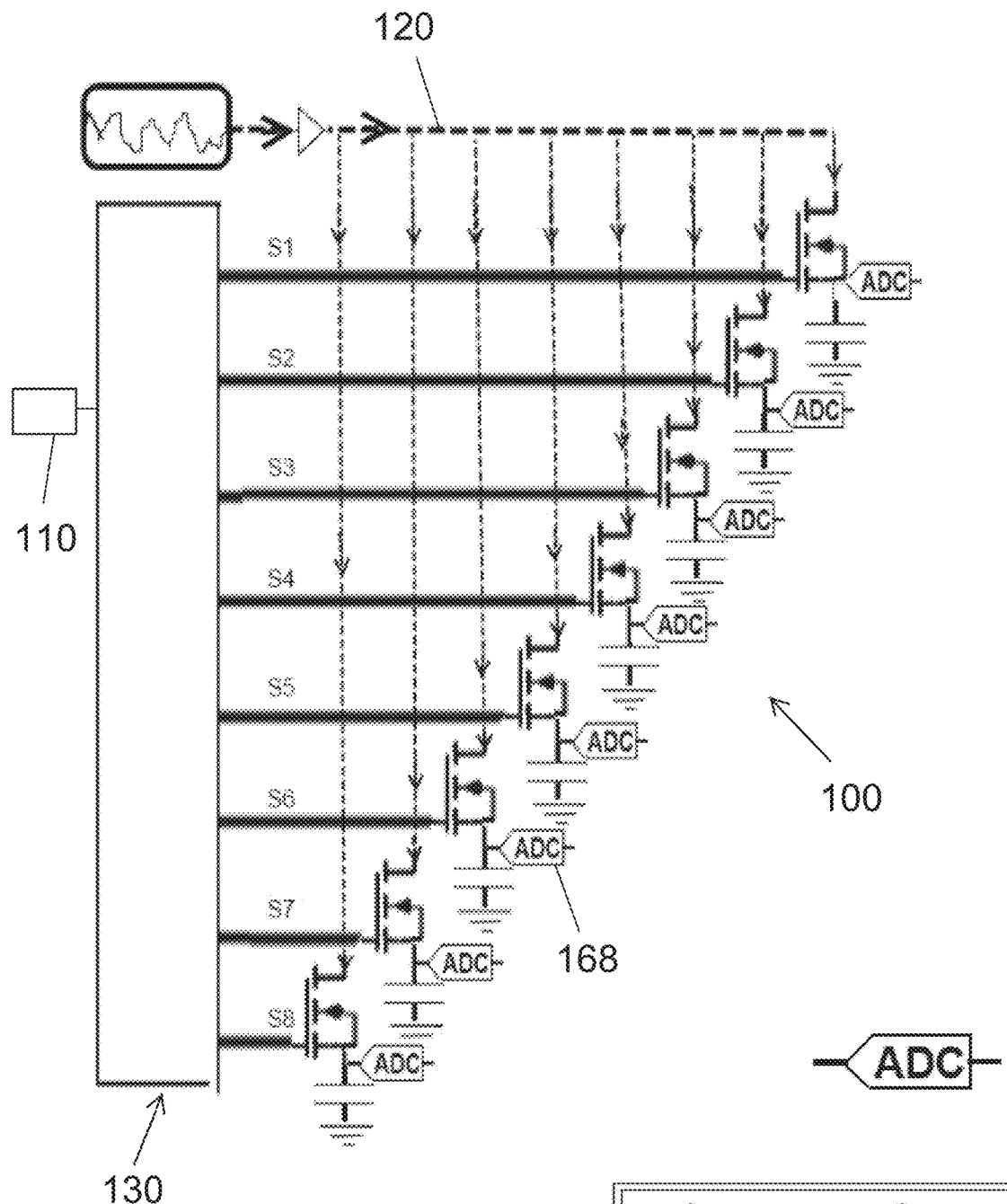
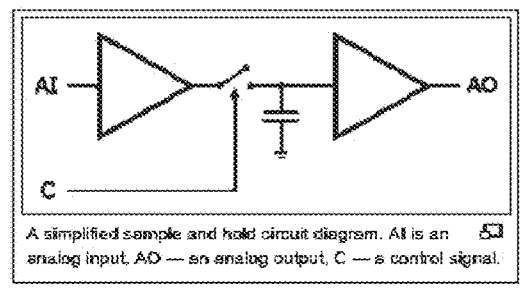
FIG. 22G

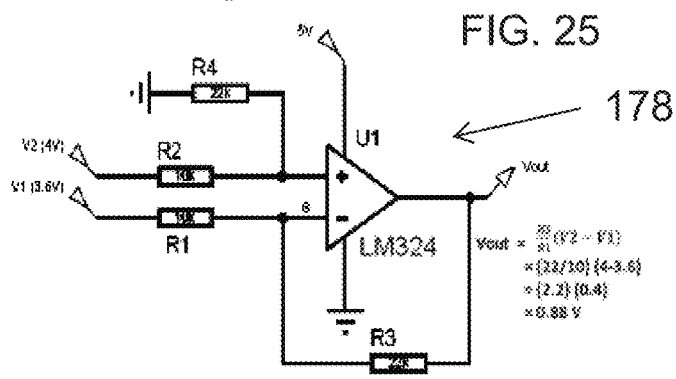
FIG. 25
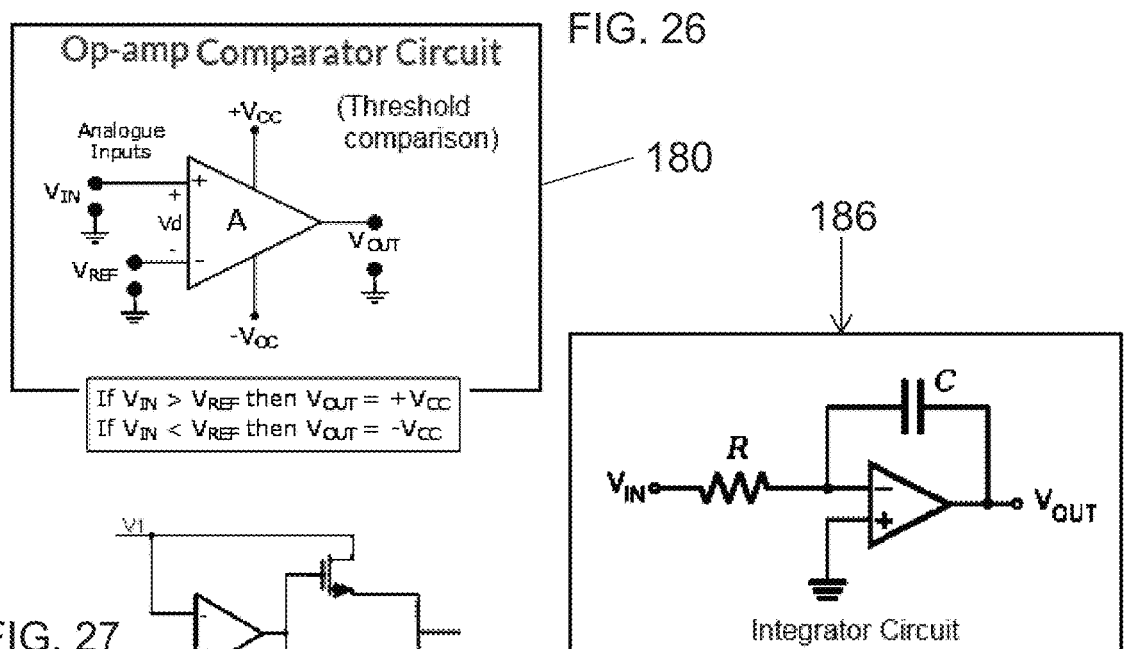
FIG. 26
FIG. 27
FIG. 28

RECEIVE SIDE

- Establish receive frequency (1/(period of each BWC waveform) (Ex. 10 MHz corresponds to 100ns waveform period)
- Establish total message bits size - 1 to N bits (Ex. 8 bits = 1 byte)
- Establish BDP duration (Ex. 1 second or 10,000,000 waveforms)
- Establish number of samples within SAC and Time locations within SAC (Ex. 16 samples within SAC – if evenly spaced such as for a sinusoidal waveform, each sample separated by 6.25 ns or 160,000,000 samples/sec and 160,000,000 samples/BDP)

ActionA - Acquire sample voltage values for samples numbers 1 thru $S_n$ within a single waveform's BWC (Ex. samples 1 thru 16 within the BWC)

ActionB - CI integrate newly acquired 1 - 16 respective samples from ActionA with respective previous samples of 1 thru 16 ($S_n$) of previous BWC waveforms (#1 with previous avg of #1, #2 with previous avg #2...etc)
(Ex. current sample #1 of BWC#3 integrated or running averaged with accumulated value for all previous samples (ex. sample #1) of BWC#1&2 averaged, similarly processed for BWC samples #2 thru #16 of BWC#3 )

ActionC - Do ActionB for all BWC waveforms sampled within a BDP duration
(ex. 10,000,000 BWC samples within one second of a 10 MHz simple narrowband sinusoidal waveform for bit #1 of the 8 bits of the message, CI down to 16 sequential time domain sample results (as CI-NCIbin#1), the 16 samples representing the waveform)

ActionD - Do ActionC for all bit's BDPs of the message (ex. all 8 bits) to acquire CI-r results for each bit of BDP (as CI-NCIbin#1 thru CI-NCIbin#8 ) . This comprises Signal Iteration #N
(Ex. For a 8-bit message, do ActionC for all 8 bits, maintaining 8 bits/message x 16 samples/bit (comprising a single CI-NCIbin) for a total of (8 bits x 16 CI-NCIbins =) 128 total integrated or averaged sample values stored or maintained)

ActionE – Simultaneously perform non-coherent integration on each CI-NCIbin separately and determine if NCI results exceed threshold deemed to be a detection result. Several NCI methods are possible including CI Max-Min results averaging, FFTs on Appended samples of each bin forming an NCI-Chain, Monotonic testing, Goertzel filtering of NCI-Chain, etc Decode message and Perform action or notify user based on message received.

FIG. 35

DIRECT CONVERSION RECEIVER USING COHERENT INTEGRATION

CROSS-REFERENCE TO RELATED APPLICATIONS

This present nonprovisional application is related to and claims benefit of U.S. Provisional Patent Application Ser. No. 62/900,046 filed Sep. 13, 2019, the entire contents of which are hereby incorporated by reference thereto. This present nonprovisional application is also related to U.S. Provisional Patent Application Ser. No. 62/867,789 filed Jun. 27, 2019, the entire contents of which are hereby incorporated by reference thereto.

STATEMENT REGARDING FEDERALLY SPONSORED RESEARCH AND DEVELOPMENT

Army SBIR Phase II Contract No. W9124R-17-C-0012

REFERENCE TO SEQUENCE LISTING, A TABLE, OR A COMPUTER. PROGRAM LISTING COMPACT DISC APPENDIX

N/A

TECHNICAL FIELD

The subject matter relates to radio frequency transmission. It further relates to receiving a radio frequency transmission with a weak signal strength.

BRIEF DESCRIPTION OF THE DRAWINGS

The accompanying drawings are incorporated in and constitute part of the specification and illustrate various embodiments. In the drawings:

FIG. 6A illustrates a graph of a bit 1 cycle;

FIG. 6B illustrates a graph of a bit 0 cycle;

FIG. 7 illustrates a graph of 8 bits in one cycle;

FIGS. 22A-22H and 22J illustrate a receiver;

FIG. 25 illustrates a differential amplifier circuit;

FIG. 26 illustrates a comparator circuit;

FIG. 27 illustrates a voltage subtraction circuit;

FIG. 28 illustrates an integrator circuit;

FIG. 35 illustrates a flowchart method of receiving and processing waveform signal.

DETAILED DESCRIPTION OF THE SUBJECT MATTER

Figure 1A:
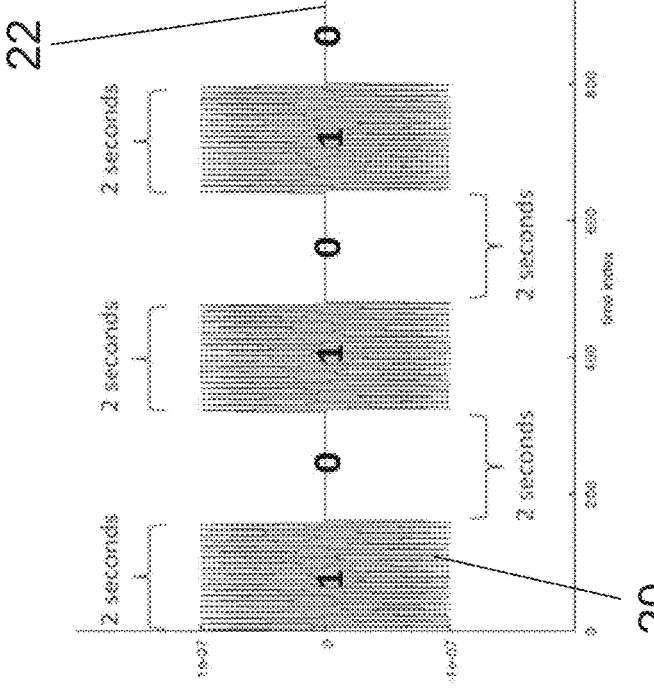
FIG. 1A illustrates a waveform transmitted as an 8 bit message with a 1 second duration for each bit.

Prior to proceeding to the more detailed description of the present subject matter, it should be noted that, for the sake of clarity and understanding, identical components which have identical functions have been identified with identical reference numerals throughout the several views illustrated in the drawing figures.

As may be used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

Anywhere the term "comprising" is used, embodiments and components "consisting essentially of" and "consisting of" are expressly disclosed and described herein." Furthermore, the verb "comprise" may be understood in the sense of including or having.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually exclusive alternatives. For purposes here, the words "comprising," "including," "having," and variants thereof, wherever they appear, shall be construed as open-ended terminology, with the same meaning as if the phrase "at least" were appended after each instance thereof.

It is to be understood that the singular forms "a," "an," and "the" include plural referents unless the context clearly dictates otherwise. Thus, for example, reference to "a surface" includes reference to one or more of such surfaces.

The verb "may" used to designate optionality/noncompulsoriness. In other words, something that "may" can, but need not.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern of description, embodiments, examples that may be provided in the present disclosure.

Before elucidating the subject matter shown in the Figures, the present disclosure will be first described in general terms.

General Description

The present disclosure teaches a receiver that designed with a circuit designed to process, based on a plurality of timed waveform reference locations, a waveform signal, the waveform signal comprising a message transmitted from a remote device. In other words, the waveform signal may represent a transmission through an atmospheric layer medium, where transmission carries the message. The transmission may represent a wavetrain, a series of successive waves continuously concatenated together an interval spacing may exist between multiple wavetrain and be as little as zero seconds. The message may carry one of a single word, a plurality of words, a numeral and any combinations thereof. The message can be also referred to as a communication. Accordingly, the receiver may be considered as a device designed to extract the message from its raw data format and reconstruct the message sent based on patterns. The raw data format relates to complex and voluminous physical properties which use basic physical elements such as time, amplitude, frequency, and phase and contained or expressed as numerical values, or data properties such as redundant data or encrypted data.

The waveform signal may be an analog signal. The waveform signal may be a digital signal. Either one of the analog signal and the digital signal carries a voltage.

The atmospheric layer medium may be an ionosphere. The atmospheric layer medium may be also referred to as a radio frequency (RF) medium, a physical entity on which or through which the RF waves pass and its associated characteristics. RF medium may be one of an air, a vacuum, solids, a water, liquids, an electrical cabling, and any combinations thereof with the associated characteristics that may be at least one of a refraction, a reflection, an attenuation, a polarization, and a delay. The waveform may be any one of a sinusoidal waveform, a non-sinusoidal waveform, a wideband waveform, a narrowband waveform, and an ultrawideband waveform at a fixed frequency or periodicity. The waveform signal may be an analog signal. The waveform signal may be mixed with undesirable electrical radio frequency (RF) noise arising from the environment or unwanted signal sources at different frequencies or periodicities from the desired signal. When processing the analog signal, the circuit may be designed with a clock source, an input, a time location reference circuit, and a signal processing circuit. When processing the digital signal, the circuit may be designed with a clock source, a clock, an input, a time location reference circuit, and a signal processing circuit. The clock source may be output different clock frequencies. When processing digital signal, the clock source may use PLL or MMCM module to synthesize other frequencies for subsequent use by the clock. An output frequency from the clock source may be converted to the clock frequency using a phase lock loop (PLL) or MMCM module Xilinx from Xilink. The clock source may be a highly accurate clock source such as any one of a Chip Scale Atomic Clock (CSAC), a Rubidium Atomic Clock, a Hydrogen MASER clock, a Cesium Atomic Clock, a GPS derived or disciplined clock, or a similar clock or means achieving high accuracy. The clock source may be an inexpensive clock source such as any one of a ceramic resonator, a MEMS oscillator, an RC oscillator, a Ring Oscillator, and a crystal oscillator. This inexpensive example may be cost-effective for small applications or relatively short-range applications such as home automation applications, asset tagging and tracking, or farm animal tracking. In operation, the clock is designed to run at a frequency which may be the Nyquist frequency or a multiple of the Nyquist frequency. The frequency may also run at a fractional multiple of the Nyquist frequency or a sub-Nyquist frequency multiple. In either form, the frequency substantially matches the baseline frequency of the waveform signal, as set by the device designed to transmit the waveform signal. The clock source may be also provided external to the circuit. The clock source may be provided as a component within the time location reference circuit, particularly when receiving and processing a digital waveform signal.

The clock frequency may run at multiples of the frequency or period of the analog signal. The clock may be running at 8 times the frequency or period of the analog signal to sample the analog signal at 8 separate equal duration locations on the waveform. The clock distributor may than be a 3-bit binary counter whose output is wired to a 1 of 8 decoder. The clock distributor then outputs eight sampling signals (S1 through S0) that are equally spaced in time. The sampling signals generate a sample acquisition and only one at a time are 'On', thus causing a sample to occur in only one sampling circuit at a time. All 8 samples are gathered before the next sets of 8 are gathered and no sampling circuit will again sample until all 8 have completed. A typical sampling sequence thus may be S1, S2, S3, S4, S5, S6, S7, S8, S1, S2, S3, S4, S5, S6, S7, S8, S1, S2, S3, S4, S5, S6, S7, S8, etc.

The input is designed to receive the waveform signal. The time location reference circuit is coupled to the clock and is designed to output the plurality of timed waveform reference locations. These timed waveform reference locations may be referred to as sampling timing locations. The time location reference circuit may be a field programmable gate array (FPGA). The time location reference circuit may be a bit-counter and a decoder. The time location reference circuit may be an ASIC. It would be understood that the time location reference circuit can be referred to as a clock distributor. The time location reference circuit may be designed to generate a far more complex signal sampling timing arrangement, and/or generate frequencies and sample rates, sampling timing, or unequal sampling timing, very different from the clock such as using a PLL or MMCM module to synthesize other frequencies and enable sampling at non-periodic intervals for use with UWE signals. Each timed waveform reference location from the plurality of timed waveform reference locations is being set by the clock. The signal processing circuit is coupled to the time location reference circuit. The signal processing circuit is designed to generate an output voltage in a response to the waveform signal being inputted into the signal processing circuit through the input and processed at each timed waveform reference location from the series of timed waveform reference locations. The signal processing circuit may be a plurality of voltage integrator circuits. Each voltage integrator circuit from the plurality of voltage integrator circuits may be a switch or MOSFET, a capacitor and a diode. The switch is coupled to each of a respective timed waveform reference location and the input. The switch may be a metal oxide semiconductor field effect transistor (MOSFET), wherein the respective timed waveform reference location is coupled to a gate terminal on the MOSFET, wherein the capacitor is coupled to a source terminal on the MOSFET and wherein the input is coupled to a drain terminal on the MOSFET. The capacitor is coupled to each of the switch and a ground to integrate at least one of a voltage and a current flowing through the switch from the input. The diode may be a low forward bias voltage drop detector diode with low junction capacitance such as low barrier Schottky diodes, small signal germanium diode, or a similar circuit element to increase circuit sensitivity. The diode may be replaced by analog-to-digital (ADC) converter to output a digital value and then digital value comparator logic to determine the voltages integrated at the sampling points as a result of the precise sampling. In a simple narrowband sinusoidal detection application, the maximum and minimum values of all the sampling points may be selected and a subtraction applied to them to determine their difference which may then be used to detect if a signal is substantially present and therefore a message transmission has occurred. Alternatively, the maximum value of all the sampling points may be selected and compared to a threshold lower value to detect if a signal is substantially present and therefore a message transmission has occurred.

The receiver may include a comparator designed to compare the output voltage with a threshold voltage and to output a parameter, for example such as "1" or "true" or "high value" when the output voltage is at least equal to the threshold voltage.

The receiver may include an indicator that is actuated when the output voltage is one of being equal to and exceeding a voltage required to actuate the indicator, i.e threshold voltage. The indicator may be a light emitting diode (LED). An amplifier may be disposed between the signal processing circuit and the indicator when the output voltage is below the minimum voltage required to actuate the indicator. Either the comparator or the indicator functions to annunciate or output a state or a value of the waveform signal.

The receiver may further include an optional amplifier disposed mediate the input and the signal processing circuit. The amplifier, when provided, increases an amplitude range of the waveform signal, and/or decreases its output impedance into a range more optimal to drive the passive and active components in the signal processing circuit. The amplifier may be selected so as to provide sufficient output voltage and current range cause the optional LED to overcome its threshold voltage and thereby illuminate. In other words, this amplifier may be sufficient to connect the LED directly to the signal processing circuit.

The analog signal may be first filtered through a filter to eliminate incidental sub-harmonics or harmonics to the analog signal and thus reduce or eliminate aliasing. This filtering may also be used to reduce the signal contributions from unrelated sources far outside the frequency band of transmission, and also may prevent saturation in amplifier circuits which may be used. The filter may be any one of a bandpass filter, a highpass filter, a lowpass filter, or a notch filter. The filter, when provided, may be placed anywhere in the path of the analog signal into the signal processing circuit.

The receiver may include a capacitor disposed mediate the amplifier and the signal processing circuit. The capacitor, when provided, is designed to block direct current (DC) from flowing back into the amplifier. The analog signal may be also DC biased using an optional threshold voltage setpoint and an inductor. The DC bias, when provided, is designed to set a detection threshold voltage. In other words, the receiver may comprise a bias circuit. The bias circuit may comprise a resistor divider and a coil. The threshold voltage setpoint input setting may be based on user's empirical experience regarding what setting has worked well in the past to generate the desired optimal results of not too low to miss too many true positive detections and not too high to trigger too many false positive detections.

Prior to entering signal processing circuit, the analog signal may pass through an optional resistor which may be used to limit the current output from the amplifier and at least partially isolate the amplifier from the signal processing circuit by limiting the current flow into the capacitor.

The receiver may be designed with a reset input. The reset input is connected to a reset line. The reset line may be used to restart signal acquisition or start a new signal acquisition period after a signal has previously been received. The reset line may simply pull the analog signal to ground or to a fixed low initial voltage below the threshold voltage setpoint. The reset line may default to a high impedance state when not pulled to ground.

The waveform signal may be supplied from an antenna. The antenna may be disposed remotely and connected to the receiver with a cable. The antenna may be disposed within the same housing (package) as the receiver circuit(s). When antenna is disposed remotely, a cable is used to connect antenna to receiver. The antenna is connected to the input and captures the waveform signal transmitted through an atmospheric layer medium. The waveform signal may be supplied through a cable connection between the input and a remote device, for example such as a transmitter source.

The present disclosure also teaches a method of processing a signal in an analog form that is transmitted as a waveform, where the signal encodes a message. The method may include sequentially processing a plurality of voltage values from the signal at a plurality of time locations within the waveform; temporarily storing all extracted voltage values; outputting a highest voltage value from the extracted voltage values; comparing the highest voltage value with a threshold voltage value; and determining a presence of the message if the highest voltage value exceeds the threshold voltage value. Sequentially processing the plurality of voltage values may include activating a plurality of switches with a time location reference circuit connected to a clock, each switch being associated with a time location from the plurality of time locations. Temporarily storing all extracted voltage values may comprise electrically connecting a capacitor to each switch from the plurality of switches.

Capacitors and all the voltages on the other corresponding Capacitors taken at the other corresponding sampling times accumulate to their corresponding voltage within the signal at the co espy relative sample point time while the noise in the signal cancels itself out at each sampling point. The voltages accumulate at each sample point and the end result is a representative voltage profile of the sample distributed across the sample points for the waveform sampled. Only the highest voltage of all samples is then passed by the diodes to be used for further processing by a human or a non-human entity, for example such as a subsequent circuit designed to control a motor.

another example, the circuit may light an LED diode to notify a human operator that the signal exists or existed during the sampling period. The optional threshold voltage setpoint may be used to manually or automatically adjust the threshold voltage and adjust the detection voltage result to control the threshold of the circuit.

It is to be further understood that when a sampling signal, for example such as a sampling signal in a sampling location S8, generated from the 1 of 8 decoder roes high, it causes MOSFET Switch 8 to conduct and to charge capacitor 8 through the resistor disposed before the signal processing circuit to the sample voltage of the analog signal. This repeatedly occurs at the repeating sample time the sample is taken. As it has been said above, the analog signal may be buried in a noise floor. The strength of the analog signal may be also below the strength of the noise floor. Random noise which may overwhelm the signal fluctuates about the mean voltage and randomly cancels itself out while the signal continues to be reinforced. Thus, the voltages on capacitors 1 through capacitors 8 randomly fluctuate with the random noise but gradually the consistent signal voltage for their respective repeated sampling points in time reinforces itself to overcome the random fluctuations and create a steadier consistent voltage on each capacitors 1 through capacitors 8 representing the waveform relative voltage for that respective sampling point.

Although 8 sampling circuits are shown as the corresponding to 8 samples per waveform, other numbers may be chosen. More samples per waveform improve accuracy, but there are tradeoffs between component capabilities within the signal processing circuit and sampling speed, as an example. A 16 sample per waveform corresponding to 16 sampling circuits may result in a higher sensitivity than the 8 sample per waveform circuit. A 2 sample per waveform corresponding to 2 sampling circuits may be constructed resulting in lower sensitivity than the 8 sample per waveform circuit. It should be noted that a result of a 2 sample per waveform design may ire the occasional possibility that the clock frequency will exactly match the analog signal frequency and that the samples happen to be taken at the zero crossing point of the analog signal resulting in no signal being detected at that time. A 3 sample per waveform corresponding to 6 sampling circuits may be also constructed.

The repeating period which results from the sample set may be one or more complete waveforms, but not a partial waveform or a set of complete waveforms with a partial waveform remaining.

Figure 36:
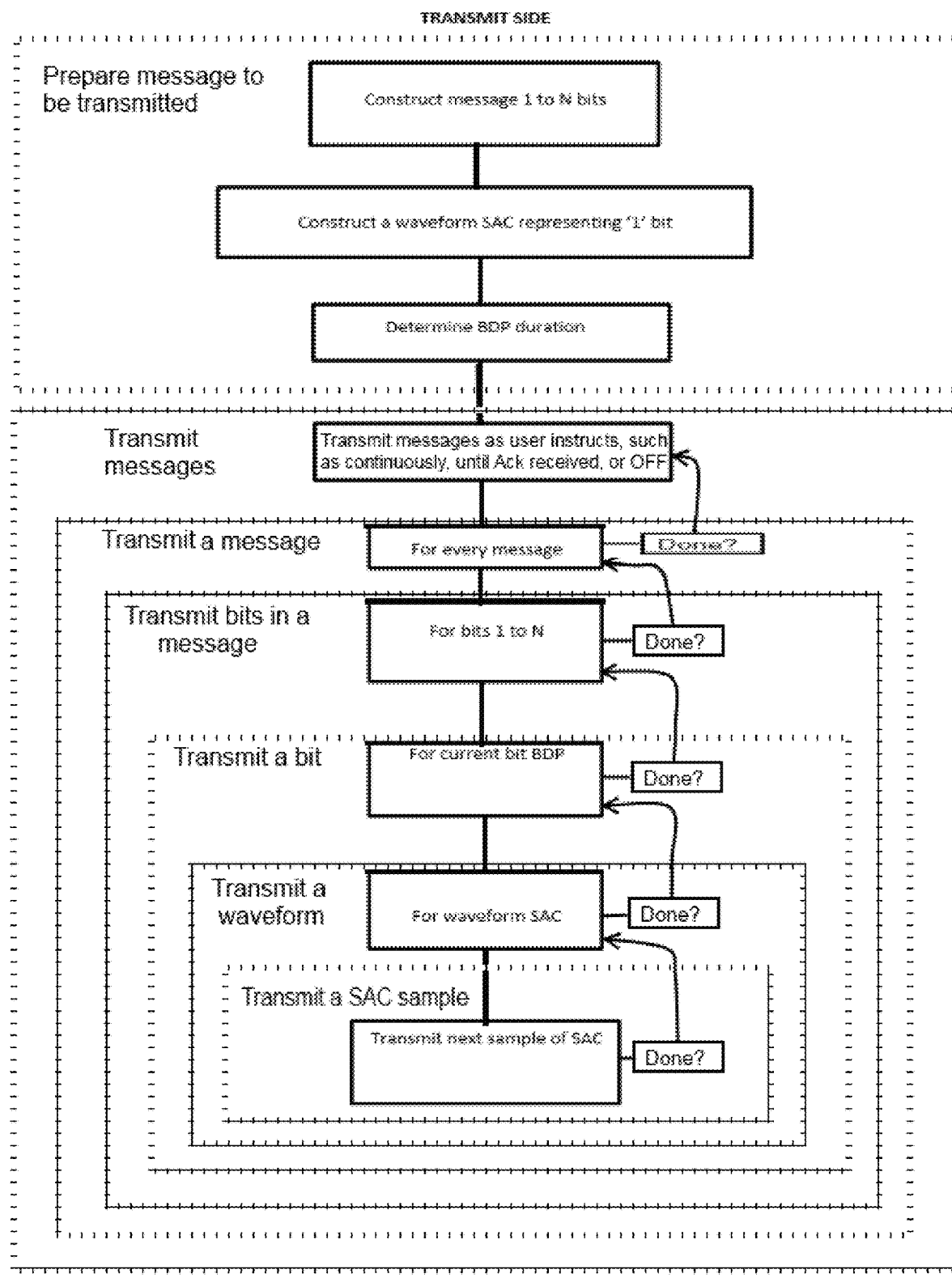
FIG. 36 illustrates a flowchart of a method of receiving and processing waveform signal.

In further details, the method may be implemented as shown In FIGS. 35 and 36. The method essentially starts with establishing initial parameters, then acquiring a waveform signal, as voltage, next, integrating all processed samples within a waveform, then processing all waveforms within a wavetrain, next processing all bits and performing coherent and non-coherent integration to determine the output voltage exceeds the threshold. Although, only coherent integration can be performed.

It is to be understood that the receiver, as described above, is designed or configured to perform a form of a time enhanced coherent integration (TeCI) at each timed waveform reference location respectively. Coherent Integration (CI) period may be substantially limited to +/−135 degrees phase change based at least on the following factors: frequency used, atmospheric layer medium variation estimation, and transmit and receive clock accuracies. The atmospheric layer medium variation may be ignored if the signal is through an empty space or is generated in a close proximity to the receiver.

The transmission period and receive period of a sinusoidal EDP single bit as a continuous wavetrain pulse within a message may be constructed to be approximately equal to or shorter in time duration than the expected period where a phase shift of approximately +/−135 degrees is on average or is statistically expected to be maintained. When this is the case, the receive optimally performs the CI technique taught herein over the entire received period of the BDP, without suffering received signal excursion periods in excessive phase shift which would occur beyond approximately +/−135 degrees within the signal. An incoming signal beyond +/−135 degrees of the current CI result would begin to diminish the CI accumulated result due to cancellation. The degree of cancellation is at its maximum when the incoming signal is 180 degrees from the current CI result. As an example, if during a 1 second BDP a strong incoming signal substantially above the noise floor is considered to initially start out at 0 degrees and maintains that for second, and them the ionosphere suddenly shifts location so that the total signal path distance changes by wavelength or 180 degrees, the final CI result at the end of that BDP would contain no substantial sinusoidal content from the originating signal as the second ½ second's integration would cancel out the first ½ second's integration. A signal received at 0 degrees phase shift throughout the BDP is most optimal with the highest final CI result. A wave portion within the BDP received at 90 degrees phase shift relative to the starting phase during the BDP would still be advantageous and further increase the accumulated CI result. A wave portion within the BDP received at 135 degrees phase shift during the BDP relative to the starting phase would not increase the accumulated CI result.

A wave train pulse (WTP) is defined as a set of continuous and contiguous sinusoidal or non-sinusoidal repeating waveforms (RWS) in the time domain. It may occupy part or all of a BDP. WTPs within a EDP may be separated by gaps of no signal. BDP are optimally constructed to maintain phase coherence within the BDP so that when a WTP stops within a BDP, a gap of no signal occurs, and later another WTP starts within the same BDP and resumes, the original phase is still maintained. The gaps or no signal within a BDP may be used for purposes such as the creation of RF precursors. RF precursors such as Brillouin precursors have been found to be advantageous in RF penetration of dispersive media such as jungle canopy.

Typically, a BDP duration may be over 10 milliseconds. A typical example of a 7 MHz BDP constructed to bounce off the ionosphere and taking into account the typical ionosphere height shift during the BDP duration and hence the resulting phase shift, is a duration of 1 second to 120 seconds to maintain a phase shift under 135 degrees and preferably under 90 degrees. For example, the seasonal, daily, and solar effects on the ionosphere determine the ionosphere movement and height variation which then determines the BDP duration needed to maintain an expected phase shift under about 90 degrees. The accuracy and drift (ex. Allen Deviation) of the transmit clock relative to the accuracy and draft. (ex. Allen Deviation) of the receive clock used to generate, transmit, or receive the transmission also constrains the optimal BDP duration. The total accuracy of the transmit clock, receive clock, and statistically expected transit phase changes thru the medium such as influenced by ionosphere drift accuracy and drift (ex. Allen Deviation of the transmit clock determine the BDP time. The higher the resulting combined accuracy, the longer duration the BDP may be while maintaining received phase within constructive integration. It will be also clear to one of ordinary the art that the lower the frequency, the longer duration the BDP may while maintaining received phase within constructive integration because frequency=(1/time).

A study of the probability distribution of signal propagation phase shift, frequency shift, and delay within the physical medium used such as ionosphere height variance may yield a more probable optimal integration period and corresponding BDP length, as the occurrences of excursions beyond about 135 degrees shift may be rare and/or brief over a BDP period of duration X and more than offset by a longer duration of integration processed over more normal periods within the BDP of minimal phase shift. Thus, a medium's behavior such as the ionosphere probability distribution shift amount and duration may be used to optimize the integration time applied. This may also apply to the AlLen Deviation characteristics of the frequency standard or oscillator being used.

Another way to consider the form of the Coherent integration method used is to consider it as a pulse compression method, wherein for example a 1 second pulse of 10,000,000 sine waves as the BDP of a 10 MHz signal is transmitted and received and ADC sampled at 16 samples per sine wave or 160,000,000 samples/sec and is then coherently integrated and compressed into a single sine wave of 16 samples. This can be done with a signal transmitted with an accuracy of about 10e-8 or better in the case of a 10 MHz sinusoidal waveform. Both the transmitter's clock drift such as it's Allen Deviation and the receiver's clock drift combined must be considered so that the resulting phase of the received. BDP does not significantly vary over the BDP duration substantially over 135 degrees over a substantial period within the BDP and degrade or even cancel out the CI over the BDP's integration period. As a rule of thumb for both transmitter and receiver clocks, clock accuracy approximately=1/(10*frequency*number-of-seconds of integration time) or better to substantially remain within phase of +/−135 degrees accounting for the Allen Deviation amount for both clocks for that period and leaving an additional small tolerance margin for physical medium variation.

The Allen Deviation drift varies at various time scales and becomes important, as the Allen Deviation accuracy at 1 second typically differs from the Allen. Deviation accuracy at 10 seconds, the Allen Deviation accuracy at 100 seconds, the Allen Deviation accuracy after 1 day, and so forth. Thus, the atomic clock used, frequency standard, or time standard's accuracy at differing time scales should be considered for calculating the BDP period, as can be appreciated by one of ordinary skill in the art.

Other inaccuracies in clocks which may be considered are dependent on the type and specifications of the clock chosen, such as aging parameters and characteristics over time in crystal oscillators, MEMs clocks, ceramic resonators, or in rubidium clocks. If the clock used is dependent on a crystal, an unknown aging period of the receiver crystal based clock and transmitter crystal based clocks may prompt the designer to take measures such as reducing the BDP duration and hence reducing integration time to maintain substantial phase coherence within a 135 degree window. The calculation of clock accuracy approximately=1/(10*frequency*number-of-seconds of integrator time) allows for a degree of allowance for this factor as a general rule, however in critical applications and when the age of the crystals or rubidium clock used or the time in the future and hence accumulated aging variance is unknown, or when one of the crystals is new and the other is of unknown age, then these tolerance considerations may be applied. As an example, if the transmitter is newly manufactured but the receiver is of unknown age, the BDP period may be reduced to accommodate the worst case age frequency drift expected, such as assuming the receiver may be 10 velars old since its manufacture started then and calculate BDP period accordingly. Another consideration factor which may be applied to the calculation is the duration since last calibration of either or both units. Clocks such as rubidium clocks may be calibrated back to initial frequency specifications, hence when it was last calibrated and its published aging characteristic specifications becomes a factor in the calculation.

As an example, a continuous 100 second transmission at 10 MHz would preferably use a clock such as a Rubidium Atomic Clock, Cesium Atomic Clock, Hydrogen Maser Atomic Clock, or Chip Scale Atomic Clock with an accuracy of 10E-10 or better. It should be noted that as of year 2020 ytterbium based atomic clocks with accuracy of $3xE-18$ have been achieved. It is envisioned that other accurate precision clock sources and frequency standards such as Quantum Time Crystals may be used instead of atomic clocks. To synthesize or convert from the clock used for an accurate timing standard to an ADC or sampling clock used to perform sampling within the BWC at the needed frequencies for this invention, a PLL or Xilinx's Vivado MMCM IP core may be used.

In addition to the accuracy consideration in calculating the BDP duration, the statistical variance of frequency and/or phase for a time period, time period within a season, and/or geographical location may result from the physical medium thru which the signal passes. An ionosphere layer during a specific time-of-day and season at a specific latitude may only rarely vary in height to cause brief excursions to the extremes of phase inaccuracy as opposed to other times.

A method of enhancing the input signal SNR in a sinusoidal narrowband embodiment is the placement or insertion of a hardware narrowband filter such as a crystal filter into the receiver input signal chain. Optimal locations to place such a hardware filter may include after an antenna but before an LNA, after an LNA, but before an ADC. In this way much larger signal interferers may be prevented from saturating the ADC, causing harmonic distortions and even periods of signal LNA or ADC saturation which obscure the desired signal. The filter may also be implemented in firmware or software after an ADC, however the benefits of preventing LNA or ADC saturation will not be realized if after an ADC.

A time-of-day clock in both transmitter and receiver substantially synchronized with each other may be used to synchronize the start of message and start of BDPs within a multi-bit message. However, a single bit mess is also contemplated herein wherein no TOP clock is needed. The Time Slots used for encoding a 1 or 0 binary signal comprising a message would thus be synchronized. An accuracy of +/−20% of BDP duration/number of BDPs since synchronization may be the maximum tolerated.

As an example, if the BDP duration is 1 second and the expected maximum time from synchronization that a receive operation would occur at is 30 days or about 2,600,000 seconds, a time-of-day clock accuracy of about +/−0.2/(2,600,000) or +/−7.7e-8. The same highly accurate clock used to maintain frequency accuracy and phase coherence may be used to maintain Time-of-day accuracy in many cases. Only a different synthesis of the final frequency result is needed. A 10 MHz output Rubidium clock standard may thus generate 7 MHz using a Xilinx MMCM module, and that same 10 MHz clock may also be used to divide down by 10,000,000 to provide a 1 second clock for synchronization of transmitter and receiver BDP start clocks, and further divide down to an 8 second clock to synch start of message on both transmitter and receiver. They may be synchronized by GPS and do not need to necessarily be synched with each other directly. Similarly, they may be frequency calibrated by GPO also in many cases.

In the transmitter, a 10 MHz output Rubidium clock may generate a 112 MHz clock using a Xilinx MMCM module or a PLL. This can be used as an ADC clock for a 16 sample BWC 7 MHz waveform in a digital circuit receiver or a 16-sample integration circuit in an analog circuit receiver. A synthesized 7 MHz square wave may be used in the transmitter to transmit the 7 MHz signal. Unwanted higher harmonics may be sufficiently reduced by a lowpass or bandpass filter which passes 7 MHz but not the unneeded higher 21 MHz and 35 MHz harmonics.

TeCI may be performed only during a period duration when a start and completion of a single bit is known to occur. After the period for that bit is over and the determination may have been made if a signal was received and a transmission occurred during that period, the reset may be used to initialize the circuit to determine if a transmission is occurring during the next or a subsequent period. The reset line may be set or pulsed periodically at the end or beginning of a CI period, the periodic timing repeat based on the expected maximum valid CI time. The expected maximum valid CI time may be based on the calculated input transmission characteristics such as the frequency, speed, doppler shift, and statistical changes of the transmitter or receiver if one or both are mounted on a vehicle or the user's empirical experience. The entire circuit may be reset by simply cycling power off and then on again, initializing all integration circuitry therein to a starting condition. This then allows a new acquisition period to begin to again determine if a transmission signal and hence message is present. This is especially applicable to a 1 bit message transmission, ON or '1' meaning status OK on an IOT device, OFF or '0' meaning status NOT OK for example.

Accordingly, the receiver, as described above, improves signal detection sensitivity, and allowing signal detection significantly below the noise floor, whereas a typical detector circuit may require the signal to be about 3 db above the noise floor to achieve detection.

The present disclosure also teaches a receiver with a circuit that comprises a clock, as discussed above, an input, as discussed above, a time location reference circuit as discussed above, a first signal processing circuit, which is the signal processing circuit as discussed above, a second signal processing circuit, a voltage subtractor circuit, and a comparator, as described above. The input is configured to receive the waveform signal. The time location reference circuit is coupled to the clock and is designed (configured) to output the plurality of timed waveform reference locations, each timed waveform reference location from the plurality of timed waveform reference locations being set by the clock. The first signal processing circuit is coupled to the time location reference circuit. The first signal processing circuit is designed to generate a first voltage in a response to the waveform signal being inputted into the first signal processing circuit through the input and processed at each timed waveform reference location from the series of timed waveform reference locations. The second signal processing circuit is also coupled to the time location reference circuit. The second signal processing circuit is designed to generate a second voltage in a response to the waveform signal being inputted into the second signal processing circuit through the input and processed at each timed waveform reference location from the series of timed waveform reference locations. A voltage subtractor circuit receives each of the first voltage and the second voltage and outputs a voltage difference between the first voltage and the second voltage. The comparator is configured to compare the voltage difference with a threshold voltage and generate an output. The receiver may comprise a voltage integrator circuit disposed between the voltage subtractor circuit and the comparator. It is to be understood that this receiver is configured to perform a form of TeCI and then a form, of Non-coherent integration at each timed waveform reference location respectively.

The present disclosure also teaches a receiver with the circuit that comprises a clock source, as discussed above, an input, as discussed above, a time location reference circuit, as discussed above, a first circuit that is coupled to the time location reference circuit, the first circuit designed to generate a plurality of voltages in a response to the waveform signal being inputted into the first circuit through the input and processed at each timed waveform reference location from the series of timed waveform reference locations, and a second circuit that is coupled to the first circuit, the second circuit designed to convert each voltage from the plurality of voltages from an analog form into a digital form through a plurality of analog-to digital converters (ADC), where each ADC is coupled to a respective switch.

The present disclosure then also teaches a method of processing a signal transmitted as a waveform and encoding a message, where the method includes outputting, with a coherent integration, a first voltage value from a plurality of voltage values within the signal at timed locations on the waveform; outputting, with a non-coherent integration, a second voltage value from the plurality of voltage values within the signal at the timed locations on the waveform; calculating a voltage difference value between the first voltage value and the second voltage value; and determining, based on the voltage difference, a presence or an absence of the message. Outputting the first voltage may comprises sequentially processing a plurality of voltage values from the signal at a plurality of time locations on the waveform, temporarily storing all extracted voltage values, and outputting the first voltage value as a highest voltage value from the processed voltage values. Outputting the second voltage may include using a plurality of voltage comparators, each voltage comparator from the plurality of voltage comparators outputting a difference between a pair of extracted voltage values, the second voltage defining a lowest voltage value from the processed voltage values.

It will be understood, in view of the above, that the present disclosure further teaches TeCI performed using precisely timed sample locations within a waveform added with corresponding time location samples within subsequent waveforms within a single or repeating wavetrain containing a plurality of waveforms to be integrated, resulting in a set of integrated samples of an integrated single waveform of the sample length of the waveform or a set of a multiple of integrated samples substantially fewer than the total number of samples in the incoming wavetrain which results in maintaining essential property information of the waveform and the length of the waveform using only addition and without using multiplication, other higher order math, or look-up tables.

As it has been described above, the receiver receives a waveform signal from a transmitter.

A technical problem may be to transmit a radio communication into an environment with difficult terrain or environments not well suited for V/UHF tactical communications without hardware relays. The physical hardware system constraints of the transmission and receiving hardware includes size and weight considerations for mobility in such environments. A combination of coherent and non-coherent integration may be used to detect signals that are received at sub-noise floor levels. The signal may be reflected from the ionosphere. The present device consists of a transmitter and receiver unit that are each frequency matched to sufficient degree to also be substantially phase locked for a period of coherent integration time to each other using a clock source. The transmitted signal may be comprised of repeated multiple bit binary data packets. The threshold of determining a binary '1' or '0' is the detection of the presence of a –received signal (resulting in a 1) or the non-presence of a received signal (resulting in a 0). The receiver unit uses Time Enhanced Coherent Integration (TeCI) employing a series of sampling occurrences within each bit to detect and identify a specified bit binary value of a signal. The receiver unit may then non-coherently integrate the bit-stream over multiple transmitted data packets to increase the Signal to Noise Ratio (SNR).

TeCI may be utilized to construct a transmitted signal that can be reconstructed across a long range, without Loss of Signal (LOS) and be reconstructed by a mobile receiving device. TeCI may be performed using precisely timed sample locations within a waveform enables the extraction of signals from transmissions that would be otherwise considered to be noise. By using time synchronized transmission and reception, fixed signal sampling over repeated waveforms can extract a frequency specific signal.

The transmitted signal has an intended binary message having a contiguous series of bits. The high bit (value one) is a continuous waveform series signal. The low bit (value zero) is the absence of a contiguous waveform series. The waveform series signal is a waveform of higher frequency than the bit rate frequency, with a fixed peak to peak amplitude. The waveform may be sinusoidal or non-sinusoidal, and may be narrowband or wideband.

The binary bit pattern i may be comprised of sequential repeated waveforms such as sinusoidal, sawtooth, square, or other arbitrary waveform configurations.

The received signal may be an attenuated version of the transmitted signal. The received signal may be attenuated by the jungle canopy, distance, water, environmental, atmospheric, and multipath destructive interference. The received signal amplitude is typically below the background noise floor signal amplitude at the point of the receiver.

The transmitter may include an antenna, a Radio Frequency (RF) power amplifier, a clock source, a message encoder means, a logic element, and/or a message input interface.

The receiver may include an antenna, a clock source, a message output, a coherent integration unit, logic element, voltage comparator, an analog voltage sampler. The receiver may also have a non-coherent integration unit.

The receiver performs signal processing on the received signal, through one of a software implementation, a hardware implementation and a combination thereof. The signal processing is by one or more of a combination of coherent integration, non-coherent integration, and integration amplitude result signal threshold comparison function. The signal processing preferred embodiment: uses TeCI to improve the SNR by precisely repeatedly sampling the continuous waveform series signal of each bit received. The TeCI sampling consists of multiple samples for each cycle of the continuous waveform series signal of a bit. The sampled points within each bit's contiguous waveform series signal cycle are integrated to enhance SNR of the attenuated contiguous waveform sere signal within or of each bit.

For each bit of the transmitted signal there is a resulting compiled integrated waveform. Each completed bit stream data packet is an individual signal iteration. Multiple signal iterations may be accumulated over time and appended into a Non-Coherently Integrated (NCI) bit chain to further enhance SNR for each individual bit of the transmitted message.

An NCI method such as Fast Fourier Transform (FFT), or averaged values of TeCI maximum values may be used on the NCI bit chain to further enhance the SNR and determine the bit value by amp) de threshold comparison to determine the presence or absence of the waveform series signal.

The ability to extract sub-noise floor signals from radio communications without relying on hardware relays in environments that deny long range tactical communications permits reliable signal transmission without LOS requirements. This can have dual use for civilian and military tactical communications in a jungle or rainforest environments. It may also have use for civilian emergency communications or for low-cost IOT communication not requiring high bit rates.

The waveform signal may be pulsed, particularly in a noisy environment, within time slots or time divisions in the time domain. The signals are communicated between at least one time synchronized transmitter and at least one time synchronized receiver. The waveform characteristics constrain coherent and non-coherent integration techniques. These techniques detect or reconstruct the signal in the background noise.

The pulsed signal data content may be embodied in or further increase the number of bits in a message. Using this additional technique, the message typically does not completely fill a continuous time or frequency slot, which thus also allows for multiple communication channels. The timing of bits to be transmitted and read allows for a more secure message because only the message bit's time or frequency slot are read and integrated. The other non-message 'empty' bits time locations or frequency slots contain only noise. Empty locations are ignored or not processed to create the final message. The non-message 'empty' bit locations are not significant for the message. These empty bit locations are noise or can be used as channels for other messages. The transmissions are therefore intermittent filling only designated bit locations. Due to the noise content of the unused and empty bit locations, if they are integrated along with time slots containing signal, they will substantially lower SNR and increase receive time needed to integrate before a message is received or sensed.

Intermittent transmissions may be used to lower the average power for a message of a specific length by encoding more virtual bits of information as time and or frequency slots while also obscuring the message. Alternatively, the intermittent transmission may serve to maintain the average power but increase the signal to noise ratio (SNR). The SNR increase is useful while receiving below, or near the noise floor. A precisely timed encoded message is transmitted in predetermined frequency or time slots, said slot locations being used to encode additional data content bits. Additionally, the transmission power of the message during the time slot may be higher or far higher than the average power, but the message may be transmitted far less often and/or of a briefer duration. Thus, the total power used for transmission may remain substantially the same, but more total message bit content may be sent. Additional open multiple time slots or frequency slots are also available for encoding or for other transmissions. An embodiment offers the use of: greater transmission power during transmission periods accompanied by periods on non-transmission, while maintaining substantially the same average power overall, in combination with the and making available (2) time or (3) frequency slots. This may allow for as many as 3 methods to beneficially combine to further increase SNR over using a precisely timed encoded message only sent continuously.

Determining Optimal Coherent Integration Period

Where a signal is reflected by the ionosphere, the key items of certainty, assumption, and simulation, i.e the starting point is Ionosphere average movement for phase change. Each bit lasts typically on the order of 1-8 seconds depending on the ionosphere movement probability distribution and frequency chosen. This varies across geographic regions, seasons, time of day, solar activity, and the 11-year solar cycle. The faster the ionosphere movement the briefer the Time-enhanced Coherent Integration should be to recover the same signal. More transmissions and transmission time are needed for more non-coherent integrations to achieve the gain needed to detect and decode the signal. The average phase shift during a set of transmissions of a bit of information should be below around a maximum of 41-135 degrees, with preferably 0 degrees. Phase shift is primarily determined by wavelength and speed of ionosphere height change. Higher frequency has a shorter wavelength, which means more sensitivity to height shift because it changes phase more for the given distance change. ((Height−change length/Wavelength)*360)=phase change degrees. By way of example, a 4 meters ionosphere drift in 1 second/40 meters wavelength=36 degrees/sec.

Some techniques to increase SNR of a transmitted signal and/or degree of message content follow:

Using the integration methods (Coherent and non-coherent) additional SNR and or data content (for example the number of bits contained in a message) can be generated using the following methods.

Note, that if fewer bits are transmitted for the same amount of time and power, bits can be transmitted more often or for a longer duration to increase SNR. For example, if an 8-bit message is transmitted at 1 bit per second for 8 seconds, vs. a 4-bit message transmitted at 2 bit per second 8 seconds, the entire 4 bit message may be repeated twice and integrated twice thus increasing the SNR by a factor of 2 where fully coherent integration is used. Similarly, a 2-bit message can be transmitted-repeatedly 4 times for a 4× increase in SNR in the same time period. Using 2-bits instead of 8-bits in the same time period, but transmitted more often or for longer increases the SNR. Conversely, more bits can be transmitted at a lower SNR.HEURISTIC APPROACH TO PROCESSING ENHANCEMENT COMPENSATION Some linear phase shift constraints such as ionosphere caused degree of phase shift per unit of time or maximum phase shift speed combined with a heuristic such as trial & error (T&E) compensation attempts can further improve integration result using a trial and error approach of iteratively or recursively choosing sections of a integration period and phase shifting them by dripping samples then CI (coherently integrating) them. This can be used to improve CI SNR results.

Knowing the maximum ionosphere height change and thus phase shift change/sec can also usefully constrain T&E attempts. Knowing there will be none or few sudden discrete phase jumps also may usefully constrain T&E compensation attempts.

Increased processing power can be applied on Trial and error attempts (T&E) for various likely phase shift profiles such as linear profiles at a continuous average shift of 10 degrees/second to find the one that results in maximum gain and thus beneficially be used to achieve gain results.

Phase shift compensation attempts can be achieved when using an analog to digital converter (ADC) by slowly changing ADC sample clock rate frequency to match the expected or desired phase shift. Alternatively, the sample frequency can be maintained at the same frequency and periodic samples can be duplicated or removed to slightly change the frequency or phase. By way of example, if the ADO samples 8 samples/cycle and the frequency is 10 MHz sampled for 1 second, if 1 ADC sample is abruptly removed from the sample set of 10,000,000 at ~5,000,000 samples in, the phase starts out at 0 shift but is shifted by ⅛ of 360 degrees or 45 degrees by the end of the samples.

In addition, the Time-enhanced coherent integration can be combined with and complemented by enhancing the SNR as described below.

MEMS Oscillators

MEMS oscillators have several programmable features that improve system performance, including options for finely adjusted and tuned frequency output and waveform tuning. Customizable frequencies can be used to optimize performance by selecting the best output frequency for their application, which can be programmed from 1 MHz to 70 MHz, and out to an accuracy of $10^{-8}$. Instead of using voltage-controlled crystal oscillators (VCXOs) or digitally controlled crystal oscillators (DCXOs), MEMS oscillators have programmable pull range from ±6.25 parts per million (ppm) to thousands of ppm to support integration into control loops, including discrete jitter attenuator loops.

The pull-range flexibility of MEMS timing devices is created by using a fractional PLL rather than pulling the resonator itself with variable capacitive loading, as is done for most quartz-based VCXOs. Because of the limited quartz resonator pull range, quartz VCXOs are usually limited to a maximum absolute pull range (APR) of ±50 to ±100 ppm. The limited pull range of quartz devices reduces the applications they are able to support because a ±50-ppm VCXO, for example, would not be able to track a frequency can be within ±100 ppm.

Thus, due to its fine frequency control than a, MEMS oscillator may be chosen to track or match to a varying clock signal such as one received based on the center frequency of a strong AM station.

Using Pulses of Power to Increase SNR

If the transmit time slot of a waveform pulse within a message or a complete message is used to contain information, a receiver's trial and error attempts on receive time slots can be used to reveal that information. For example, if a signal is found in the 23rd second of every 100 seconds after the start second (ex. 1:00:00.000), where the signal is contained in 1:00:23.000-1:00:23.999 . . . 1:00:46.000-1:00:46.999 . . . 1:01:09.000-1:01:09.999 . . . and so on . . . ) of the hour, then the discovery of the presence of this signal in those slots using T&E creates additional information yielding the number '23'.

Note that the same power is required to transmit 1 second every 10 secs at 10× power in that 1 second as to transmit continuously at 1× power. (Ex. 10 watts for 1 second transmitted once every 10 secs=1 Watt transmitted continuously). However, if it is known only to receive during the 'active second' because the predetermined second is the active second for a synchronized transmit and receive, Valid data is then received beneficially at 10× the SNR or 10 dB higher. The non-active seconds are known to contain only noise and CI (Coherent integration) of them in also would only reduce SNR. Alternatively, the other unused seconds can be used as active seconds for different or other communication channels.

Continuous Transmissions Vs. Periodic or Sporadic Transmissions:

The following scenarios may illustrate various continuous transmissions and the SAME TOTAL POWER required.

Scenario A: transmitting 20 watts continuously for 1 second.

Scenario B: transmit 200 watts for 0.1 secs.

Scenario C: transmit. 2000 watts for 0.01 secs.

Similarly, the relationship between power and time applies to 20,000@0.001 secs and so on).

More slots and trial and error attempts increase processing requirements exponentially. Therefore, processing feasibility vs. computer power available is an issue.

In the tradeoff of the scenarios stated above the average power is unchanged. However, the instantaneous power increases to a point where transmitter, cabling, power supply, or antenna voltage and current limits MAY BE exceeded. The economically feasible point with current technology is based on the expense of the circuitry at higher voltage and current tolerances.

In the case of 10 MHz, the practical minimum duration limit is 1 cycle for 100 ns, i.e. 10,000,000× the power for 1/10,000,000 the time.

If the above signal received is at 0 dB relative to the noise floor in scenario A, then it would be 10 db above the noise floor in scenario B and 20 dB above the noise floor in scenario C. The bandwidth however is different between them.

Alternatively, instead of transmitting continuously at 20 watts with 10 seconds per complete signal and repeat, transmitting at 200 watts for 10 seconds followed by a pause of 90 seconds with no transmission achieves the same average transmission power. However, received SNR beneficially increases 10 dB or a 10× increase in instantaneous power. The receiver would be configured to anticipate a transmission period of 10 seconds within a 100 second period and the time slot where it would occur and ignore the other 90 seconds where it is known no signal and only noise is present. Thus, the noise of the 90 seconds is not integrated into the signal and the signal is not 'diluted' by the noise, maintaining a 10 dB SNR increase. Similarly, a 20 dB or 100× improvement can be achieved by transmitting a 2000 watt signal for 10 seconds followed by a 990 second period of no transmission and no power draw. In this way a battery or power source of fixed watt-hours may maximize its power usage within a transmitter to transmit at a higher SNR. The battery must be able to efficiently provide the higher output power for the same time period. Alternatively, temporary storage of the battery power must be provided. For example, using a battery to charge a supercapacitor or a bank of supercapacitors.

A pulse transmission can encode information. By way of example, a pulse of an interval of 1/100 of the time in Scenario C that occurs in the time slot 4, i.e. between 4/100 and 5/100 may contain an additional information value of '4' and may be transmitted/assumed, even though it's a single unmodulated pulse or the time location of a complete encoded message such as an 8-bit message.

If both transmitter and receiver are configured to only receive at specific time slots and the signal is buried below the noise floor, such as 30 db, observers looking at a broader average will have the data averaged down by the longer duration noise floor. However, where the transmitter and intended receiver only transmit and receive at the specific time slot, the receiver does not integrate the other time intervals where no signal is expected. Thus, the received signal SNR is many times higher. If both transmitter and receiver have a known semi-random or random or complex pattern, then they can use it to scatter the brief signal buried below the noise floor throughout the time domain.

Theoretically, an interloping receiver can receive all time segments at a specific frequency and using trial and error attempt to and reconstruct the hidden signal, but the number of combinations is enormous. If 100 sub-divided time slots within a repeating time allocation containing 100 sub-divided time slots are used, and for example 30 signals integrated together (coherently or non-coherently) needed to receive and reconstruct the signal to exceed the noise floor, the combinations are approximately $(100!/(100-30)!)$. Thus, it is computationally unwieldy.

Combining the above described simple periodic pulses of encoded power, with TeCI will allow the secure extraction a signal from the noise. The time slot from time enhanced coherent and NCI described above can contain a carrier wave CW coded signal, a repeated analog signal, a signal of any modulation, or as unmodulated pulse at specific times. This approach combines well with the time enhanced coherent integration and non-coherent integration to extract a repeated signal from the noise.

Similarly, the SNR enhancement method above can simply be used with Time enhanced coherent and non-coherent integration of encoded signals. This can significantly enhance their SNR.

For broader applicability, a relatively strong highly accurate phase coherent signal or even a less accurate signal can be sent and received for use as the basis for a clock source instead of or in addition to an accurate clock, atomic clock or GPS. Two (2) very low power stations can transmit and be received successfully as long as they can both receive the common accurate clock source signal or less accurate signal as a time base. One or more local clock re-transmitters can be used to boost the clock source. These boosters can be located anywhere or spread out around the globe. Alternatively, any strong but generally frequency accurate signal such as an AM or FM local radio station can be also be used as a clock basis. Due to the finite speed of light, and if the clock source varies in phase or frequency, the clock source variations are delayed but the clock source with its inherent variations can be stored in memory and replayed to compensate for the speed-of-light over distance delay. If the exact delay duration is unknown, a trial and error approach can be used in the receiver to establish the best delay period to use to integrate the signal and extract it from the noise. This is especially true if the transmitter, receiver, and or clock source locations are unknown. Here, a very fast ADC with many sample multiples over Nyquist is advantageous as past ADC samples of the received weak signal can be processed by duplicating or deleting samples to simulate phase or frequency adjustments. This is based on the received clock variation sample segments, the segment locations (and hence time delay locations) being and subsequently processed as part of the integrations on a Trial and Error basis to find the optimum match. This determines the time delay and the variations which may have occurred due to the received reference signal frequency or phase drift.

A synchronization signal can be transmitted to indicate start of message or a pattern matching approach can be used to match up received messages delayed differently in time for subsequent CI or CI attempts. Pattern matching must typically preserve the received signal in memory for later pattern matching attempts. Integration is done afterward in the receiver matching the pattern. The memory buffer preferred is slightly larger than the sample frequency times the estimated length of the maximum lightspeed propagation delay caused by the distance between transmitter and receiver. For example, for an 80 MHz Nyquist over-sample rate on a 10 MHz signal, with a lightspeed delay of 1 millisecond maximum, a minimum buffer of 80000 samples is preferred. Larger Past ADC data buffers and received clock buffers are recommended to try to reconstruct past data, but also require more processing power in more trial and error attempts.

Due to variations in long signal paths, signals will sometimes be delayed. Synchronization may be applied by software or hardware. This again may use a heuristic varying of phase or frequency to recover the signal aka message using CI.

Signal filtering in hardware or software such as a FIR filter may serve as an FIT replacement in the non-coherent integration signal detection phase. Circuit resources and receiver cost are reduced by multiple filters. Specifically, controlled delays or skipped-or-duplicated samples to filter individual frequencies such as CIC filtering. A comparison of the signal strength at a very narrow frequency band with the strength of an adjacent channel frequency may be done to identify the presence of a potential signal for possible further CI processing. Alternatively, signal strength comparisons of various time slots instead of frequency slots can encode or receive a signal. The method herein can use a frequency basis or a time basis to encode and decode the signals. For example, instead of on and off at strictly 7 MHz, the signal may be 7000000.0 ON 1 sec, 7000000.1 ON 1 sec, 7000000.1 ON 1 sec, 7000000.0 ON 1 sec for binary transmitted code 0110. The length of samples integrated determines resolution bandwidth (RBW) of non-coherent integrating FFT. For example, 8 samples per cycle of a 1 MHz sine wave=EMSPS=125 ns/sample. 8 Msamps for 1 sec may use a 1 Hz RBW, however 8 Ksamps=1 ms=1 kHz RBW. It is possible to use a low accuracy clock with far briefer signals integrated far more often to also achieve gain if the received signal is strong enough.

The synchronization may be by GPS-disciplined accurate clock references. However, it can be by WWV, WWVW, or CHU Canada time standards, or AM radio or shortwave stations.

In applications where both very low power transmitter and its receiver receive the same timing less expensive devices are made as opposed to employing a Rubidium clock and also requiring significantly less power. The transmitter uses the received accurate pseudo-clock such as an AM radio station center frequency with a strong signal as a time reference basis. The transmitter creates its signal based on its clock being disciplined by the received accurate strong signal as a clock, generally as phase coherent as possible. The receiver receives the transmitted signal also based on the same semi-accurate clock and then integrates the transmitter's received signal. If the frequency accuracy of the received signal and transmitted signal or the phase drifts, then in one reconstruction mode the receiver matches the frequency or phase drift of the distant strong signal common to both, it then uses the integration technique to recover the signal that is below the noise floor.

In this way, a very low power transmitter signal can be received by remotely using a very simple inexpensive receiver while maintaining the phase by receiving and using a common coherent or a semi-phase coherent reference signal as a clock signal.

Typical Rubidium clock accuracy can achieve approximately 150 secs of phase coherence at 7 MHz. This accuracy results in 15 secs of coherence at 70 MHz, 1.5 secs at 700 MHz, or 1 sec at 930 MHz. Repeating the same Phase coherent signal of 1 sec length then non-coherently integrated would work to increase the range by increasing SNR. Similarly, 1500 secs of phase coherence can be had at 700 KHz, in a linear relationship.

A simple inexpensive low power internet of things (IOT) devices can transmit a distant signal using the teachings herein.

This is especially true for TOT devices which perform energy harvesting in addition to a battery or to supplement a battery from, for example, solar cells. A supercapacitor may be used to store the energy for higher power intermittent bursts of RF signal, offering the same average power but at a higher SNR as the receiver ignores the noise occurring during the non-transmission periods.

A cell phone frequency signal can be repeatedly sent based on this approach. A 930 MHz is a 10 cell phone frequency and is useful to send simple emergency messages. In an emergency, the receiver tower can respond with a much stronger signal to be received by the weaker cell phone. A signal geolocating technique may be used to aim a high gain antenna towards the weak signal cell phone to communicate a response. A $10^{-9}$ or $10^{-10}$ accurate clock or signal source can maintain phase accuracy with a 930 MHz transmit signal for at least 0.5 secs or better. A cell phone tower and cell phone can both use the frequency discipline of a received GPS signal, for timing and frequency accuracy.

Multiple cell phone carriers employ frequencies in the 800 MHz to 900 MHz bands, with some in the 700 MHz band. These lower frequencies can maintain phase accuracy for a given clock source or timing source longer than higher cell phone frequencies. This reduces phase coherence inaccuracies during a Ci integrated transmission between the transmitter and receiver to cause phase shift between them larger than ~135 degrees. This is excessive and greatly diminishes and can even negate the constructive coherent integration's enhancing the signal SNR.

The clock source may be used to provide an accurate basis for the transmitting frequency using one or more of a frequency multiplier, a phase locked loop, and a direct digital synthesis (DOS) or Xilinx® MMCM module method such as that employed in an FPGA.

A high gain highly directional antenna may be used to acquire a distant clock source signal. The same received clock frequency may be used as a basis to retransmit a signal to a receiver. A second high gain highly directional antenna aa; be used and aimed towards the remote selected receiver. Alternatively, an omnidirectional antenna may then be used to transmit to multiple receivers or receivers in unknown locations.

All receivers may have a relatively inaccurate clock, but the initiating transmitter of location A establishes the clock frequency using a periodically transmitted high power signal and the others 'lock in'. Subsequent intermediate transmissions are at lower power. The issue of 2 or more transceivers having separate internal clock sources with frequencies that do no match is eliminated. Also, a less accurate inexpensive clock source can be used in all member transceivers in the linked chain.

Two (2) or more transceivers may communicate using substantially phase coherent integration and repeated signals with less power, more distance, or more certainty by using the following methods. Location 'A' transmits at frequency 1×, location receives the transmission and uses it as a clock to transmit it at a different frequency such as a harmonic (such as the 3rd harmonic) or a synthesized frequency received from location W.

Cell phone bands in current use are suitable. The bands include, but are not limited to, the selected frequency transmit receive allocation:

3G: 800 MHz ESMR, 3G 900 MHz (GSM-GPRS/EDGE/ UMTS/HSPAIHSPA+), 4G: 700 MHz Lower Block A, 4G: 700 MHz Lower A/B/C 2/4/5/12 (LTE), 4G: 800 MHz ESMR.

However, higher or lower frequency bands such as 433 MHz are also feasible, especially for TOT type devices. A high gain highly directional antenna may be used to acquire the external clock source.

If a signal is not reflected by the ionosphere or similarly unpredictable moving medium, the coherent integration time can be maintained for a much longer period, creating higher SNR due to a higher ratio of coherent to non-coherent integration time.

Accurate clock sources also include, one or more each or in combination for enhanced accuracy or selected for best accuracy: satellite based units such as GPS, Beidou, Galileo, and GLONASS or the like. Inexpensive transmitter units may only receive local AM broadcast stations and use them as a clock source. The receiver may use the same AM station to match the clock of the transmitter more accurately. The receiver's received clock signal may be shifted in the time domain to more accurately match the transmitter's received clock signal and received signal which is using a sample of the earlier clock source which may be at a slightly different phase and/or frequency. These shifts may be attempted on a T&E basis to find the best fit and hence best SNR.

An optical clock may be well suited to this application due to its accuracy, producing ticks paced at 22 gigahertz about twice as fast as those of cesium-based metronomes. But because the optical clock's gigahertz ticks are based on the much shorter, terahertz beats, they're far more precise than the gigahertz ticks of cesium clocks. The duration of each second counted out by the chip-scale optical clock (at 385 Trillion Hz) matched to every other, to around five trillionths of a second. That is about 50 times better than the current cesium-based chip-scale clocks.

Alternatively, the receiver may use T&E and additional processing power to 'find' the proper offset amount and/or the proper repeat time interval and/or the proper transmission duration and/or the proper frequency slot. The correct matching T&E will result in the highest SNR and hence finding the signal buried in the noise the fastest.

The above parameters, but especially the offset and frequency slot, may be used to encode more information or bits. In this arrangement the receiver does not pre-know the frequency and/or the time-offset slot. The code to be transmitted may also include (or solely include) these parameters. A 10-possibility time slot X and a 52-possibility frequency slot yields a 520 possibility combination. This may be used to generate an additional 9-bits of data as 2 raised to the power of 9 (i.e. 2^9)=512. The added 9 bits are encoded at the transmitter unknown to the receiver and the receiver must use processing power to employ combinations to 'find' the correct slots used by the transmitter and hence find the additional 9-bits of data. These data bits may be message bits and/or parity bits or a combination of both. The message may consist of a single 'on' transmission period wherein the data is encoded solely in the slots chosen for that transmission period.

Alternatively, the slots may be pre-determined for both transmitter and receiver. However, the signal is hidden from an interloper, forcing them to use much more computing power and memory space to find the message. Since the message is below the noise floor for a number of iterations and integrations, therefore it may not be present or may only be found after a long duration of integrations.

Here the more processing power for a long duration of time domain data can be applied to extract the desired signal buried within the noise. Greater processing resources are needed to find and extract a signal which is deliberately hidden or in which additional bits of data are hidden in the transmit characteristics described above, one or more each or in combination. The larger the range of possible Time, Frequency, Phase patterns, the larger number of possible implicit coding combinations and the larger the computational resources needed.

Alternatively, the Time, Frequency slots may be deliberately scattered in a more complex pattern to either more deeply hide the signal or encode more bits into the message using no additional power to transmit, only additional power at the receiver to process and decode.

Waveform signal can be encoded for obfuscation purposes or for information adding purposes. In the case of encoding for information purposes, the additional Time displacement code is shown as a resource to be appended to the bits of information and/or the parity check or Forward Error Correction code.

Both transmitter and receiver can be designed so that the expected time slots to be used are synchronized.

Both transmitter and receiver can be designed so that the expected time slots and frequency slots to be used are pre-synchronized in time-of-day and frequency calibration substantially better than 10E-6 or 0.0001% frequency accuracy.

Such patterns may include the time slots and/or frequency slots used be sequentially based on the digits of an irrational number or rational fraction, or several such numbers, or prime number sequences, or other encryption or hashing techniques. For example, the transmission frequency slot may be based on Pi (3.14159 . . . ) wherein the transmitter may first transmit at 3×100+7000000 Hz, next at 1×100+ 7000000 Hz, then at 4×100 4+7000000 Hz corresponding to the 1st 3 digits of Pi, 3 then 1 then 4, . . . , etc. The encoding may wrap around such that 7.0 MHz=(codes to) '0', 7.0001 MHz='1', 7.0002 MHz='2', 7.0003 MHz='3', 7.0004 MHz='4', 7.0005 MHz='5', 6.9996 MHz='6', 6.9997 MHz='7', 6.9998 MHz='8', 6.9999 MHz='9'.

Alternatively, a semi-randomized, pseudo randomized, or fully randomized Time-Frequency pattern may be chosen to obfuscate communication. Some combination constraints may be pre-determined for the receiver (ex. the 1st 2 time-frequency slots) but others randomized so that even an/or one or more of the authorized receivers may need processing time to decode the message in addition to integration time.

Uses for this include sending an encryption code securely and separately or sending a message where the receive is delayed until sufficient integration time is expected to be needed to occur in the receiver.

The closer the proximity of the receiver is to the transmitter or the greater the transmitter power, then less integration time is needed. Conversely, more computationally powerful receivers may be located at a greater distance. An encoding scheme may be chosen to add computational depth due for a substantial volume of random time-frequency content, therefore favoring more distant more powerful receivers. Similarly, few or no random time-frequency content or elements may be added to favor nearby receivers.

A signal strength may similarly be deliberately reduced to prevent receipt of the message 'too soon'. A deliberately configured directional antenna may be configured to favor reception of a signal by receivers located in one or more specific directions.

Energy harvesting means such as a solar cell, a battery, or supercapacitor can be used to store the accumulated energy to be used for transmission for a brief period or a periodic higher power transmission to achieve a higher SNR.

Multiple transmitters located in separate known locations and synchronized to transmit the same phase coherent message may be used to create geographic 'dead spots'. Using omni-directional antennas and transmitting deliberately out of phase to create regions of constructively reinforced interference signal and other regions of destructively reinforced interference signal. A valid receiver, i.e an intended receiver, in this case must use a directional antenna aimed towards location or the direction of the transmitter to receive a signal, or be in a location where the signals are reinforced. A complex pattern of phase shifts may also be used to create moving dead spots or moving reinforced spots in specific geographic locations. The moving spots favor one set of moving vehicles traveling along a specific path at a specific speed while reducing, inhibiting or preventing others moving at a different speed or along the wrong path from receiving the transmissions. A more directional antenna(s) may similarly be aimed, powered and or radiation-pattern chosen to enable more options in crafting regions of reinforcement and dead spots. Directional phase-shifted antenna arrays may be used to also achieve this.

A method of achieving sufficient phase coherence is as follows when transmitter and receiver are located at a great distance and phase changes due to change in propagation characteristics such as ionosphere drift, sporadic F activity, grey line onset, or the like occur. Both transmitter and receiver use a pre-determined high power broadcast station as a reference signal standard. The reference signal is received by both. The broadcast station is substantially near the transmitter in location and at a frequency and phase of the reference signal standard. If the transmitter is near the high power transmitter such as a shortwave broadcast station, the transmitter receives and uses receives the high power broadcast signal as a frequency and phase reference to transmit its signal at a different frequency. The distant receiver also uses the high power transmitter as a frequency and phase reference. Because the path taken by both the high power station and the low power transmitter are substantially the same and the frequency is very close. Also, the refraction and reflection of both signals is substantially the same. Thus, the remotely located receiver can maintain phase coherence for coherent integration purposes for longer than without the phase reference clue being provided. The Preferable frequency range is 1.5 to 30 MHz and shortwave frequencies.

A heuristic approach can be used by the receiver to find the best match of time-delayed frequency and phase reference from a reference source such as a strong AM station signal received and used by both or a distant shortwave station located near the transmitter but far from the receiver and similarly heard and used by both as the reference source.

It should be noted that local AM stations should be encouraged to employ an atomic clock to accurately transmit it their fundamental frequency and enable the above receive enhancement methods with greater accuracy and hence range or lower power.

Prescribed selected or semi-randomized phase shifts in the transmit signal may also be used to obfuscate the signal by phase cancelling the time based coherent integration signal with itself. For example, an earlier part of a 1 second signal for a bit (the 1st ex. 500 ms) may be 180 degrees out of phase with the 2nd (ex. 500 ms) half of the 1 second signal. This can be used in a similar manner as an orthogonal separate dimension to time and frequency slot to provide obfuscation or provide one or more added codes, which can be computationally decoded or discerned. This requires a combination of enough processing power or with sufficient fore-knowledge of all or part of the expected pattern.

For example, in a repeated 1 second transmission, the first 100 ms may be transmitted at the reference phase of 0 degrees;

the second 100 ms may be transmitted to shift the phase 180 degrees;

the third 100 m may be transmitted to shift the phase 0 degrees;

the fourth 100 ms may be transmitted to shift the phase 180 degrees;

the fifth 100 ms may be transmitted to shift the phase 0 degrees;

the sixth 100 ms may be transmitted to shift the phase 180 degrees;

the seventh 100 ms may be transmitted to shift the phase 0 degrees;

the eighth 100 ms may be transmitted to shift the phase 180 degrees;

the ninth 100 ms may be transmitted to shift the phase 0 degrees; and the tenth 100 ms may be transmitted to shift the phase 180 degrees;

The above combined with the frequency slot encoding method and time slot encoding method increasing the number of combinations and hence the total information content such as the number of bits effectively transmitted.

The above may be used to transmit a 1010101010 bit pattern, wherein as the signal is below the noise floor, the receiver may use a heuristic combination of phase shift compensation to extract the bit pattern sent. The heuristic combination with the highest signal strength is seen as the proper bit pattern pre-determined coordinated start time for the pattern, pattern number of bits, and pattern duration is again useful to decode the message faster. It must be noted that an extremely high computational effort can be used to extract a finitely complex Time-frequency-phase pattern from below the nose floor, but the computational effort increases exponentially.

Multi-level SNR depth patterns using known regions of repeated same values within a signal. For example, the 1st bit value may be repeated 4 times in 4 slot positions, thus this bit value can be integrated more rapidly than bit values which are represented by only 1 slot position. In this way a broadly ranging message 'depth' can be sent with initial values being discerned first, then later a larger quantity of briefer values are discernable, with more and more time needed for greater detail and more total data.

The initial repeated values may be used to indicate a (ex. preestablished and known to both transmitter and receiver) code chosen to indicate which one or more decoding algorithm, frequency pattern, time pattern, and phase pattern to look inside to more rapidly receive, integrate and decode the signal—as clues.

Alternatively, a set of messages may be sent wherein some digits are pre-determined to be repeated and others are known to be parts of additional messages to be decoded. For example, a 32-bit data content message may be sent wherein the 1st 4 bits are always sent as '1' and hence decoded first, the 2nd set of 4 bits indicate an auxiliary message number 1 16, the 3rd set of 8 bits are the auxiliary message content, and the remaining bits are used for parity bits or Forward Error Correction bits. As an example, the messages allocation % and a message allocation pattern may be preestablished and known to both transmitter and receiver and the synchronization and times pattern for each message type may be predetermined.

Example message types sequence pattern sent over time repeatedly may be preestablished to be:
Message containing Auxiliary message 1;
Message containing Auxiliary message 1;
Message containing Auxiliary message 1;
Message containing Auxiliary message 2;
Message containing Auxiliary message 1;
Message containing Auxiliary message 1;
Message containing Auxiliary message 3;
Message containing Auxiliary message 1;
Message containing Auxiliary message 1;
Message containing Auxiliary message 1;
Message containing Auxiliary message 4;
Message containing Auxiliary message 2; and
repeated.

The above sequence of 12 messages repeat until, for an example, the receiver transmits a message indicating the message is received or a sufficient portion of the message has been received with sufficient likelihood of accuracy. As seen from above, Messages containing Auxiliary message 1 will be received first, they are 8/12 or ~66% of the messages. Messages containing Auxiliary message 2 will be received second, they are 2/12 or ~16% of the messages. Messages containing Auxiliary message 3 and 4 will be received last, they are each 1/12 or ||8% of the messages.

A possible message content of each example may thus be:
Bits 1-4: the same bit values sent every message for fastest reception and integration-based decoding, (ex. 1011)—16 possible message categories or status codes as a usage example. This is the data that is typically most important or must get through the soonest;

bits 5-8: different bit values sent indicating the auxiliary message number of the message chosen by the transmitter operator being l sent in the bits that follow (ex. 0001, 0010, 0011, 0100) message number 1 of 16 possible using 4 bits as message number;

bits 9-16: auxiliary message sent corresponding to or associated with the message number 1

(ex. 10111010): bits 9-16: auxiliary message sent corresponding to or associated with the message number 2

(ex. 01110010): bits 9-16: auxiliary message sent corresponding to or associated with the message number 3

(ex. 10000010): bits 9-16: auxiliary message sent corresponding to or associated with the message number 4

(ex. 0:1110111): thus, the following message sequence is transmitted repeatedly.

1011000110111010 (message 1) message seq no. 1;
101100011011010 (message 1) message seq no. 2;
1.01.1000110111010 (message 1) message seq no. 3;
1011001001110010 (message 2);
1011000110111010 (message 1);
1011000110111010 (message 1);
1011001110000010 (message 3);
1011000110111010 (message 1);
1011000110111010 (message 1);
1011000110111010 (message 1);
1011010001110111 (message 4);
011001001110010 (message 2) message seq no. 12 transmitted repeatedly.

Instead of a binary CW signal being sent, an analog time domain signal such as an AM modulated signal may be repeated over and over and integrated coherently or non-coherently to enable eventual reception by the receiver. The same message start time, duration and frequency may be predetermined for the transmitter and receiver and the receiver may use time enhanced coherent integration to integrate the same message over and over repeatedly until the message is judged to be received with sufficient clarity by the operator or until the message's SNR exceeds a predetermined SNR threshold—being measured continuously and automatically.

Using the above technique, the best results may be achieved if both transmitter and receiver are in a fixed location and there is no substantial variance in the signal path length due to it bouncing off the ionosphere or other moving mediums or objects such as vehicles in a multipath RF reflection environment. Phase coherence can be maintained to a higher degree in these circumstances.

Multiple receivers or multiple receive channels may be used to try to more quickly receive the signal by the receiver at different frequencies—if they are present.

Uses of the teachings herein may include helping friends find each other at a ski hill, track wildlife, geolocate ships, follow yacht races, monitor bike rentals, while tracking numerous things like drones, rental cars and trains.

It is important to note that optimal receive speed results when synchronization between the transmitter and receiver is established. This is typically a Time-of-day (TOD) synchronization so the transmitter starts a next bit transmission at the beginning of a specific second for example, and the receiver expects a new bit to similarly start and hence begins integration for the next bit at that time of day boundary. It is important to note that frequency accuracy (ex. $10^{-7}$ to $10E^{-9}$ or better) is very important for time enhanced coherent integration to maintain phase similarity over extended periods of time from seconds to minutes typically, but for example Time-of-day synchronization need only be accurate to $10E^{-5}$ if the transmit-receive effort begins only a few hours or minutes after synchronization occurs. An astronomical means may be used to resynchronize Time-of-day.

A heuristic may be used to recover synchronization, by using start times of bits or messages to be computationally integrated and attempted at fractions of seconds within a second until the strongest signal strength is round indicating the correct framing of the starting time of the signal occurred.

TOD synchronization (TODs) may occur between transmitter and receiver directly, such as transmitting a synch pule or time of day from one to the other, the TOD receiving unit resetting its clock to match the newly received TOD. Alternatively, TODs may be achieved by both units receiving a synchronization from the same or a different time standard such as a GPS time or WWVW/WWV/CHU time signal.

Described herein is a process of hiding transmitted data. Among them are:

power pulse and frequency allocation interact, mixed, preestablished or 'encrypted' start times appears sporadic. Described herein is frequency lumping and time—using a preestablished pattern such as prime numbers or pi digits signal spread between multiple frequencies.

Described herein is a Phase modulation pattern to cancel and hide messages:

phase modulation, frequency or start time based on externally received signal in common with receiver and transmitter or from the receiver) described herein is how a message could be split between time and frequencies to increase the encryption.

If location of receiver known relative to transmitter, then phase compensation and doppler shift compensation of signal can be done. Alternatively, a heuristic approach by receiver can be done to find best match to transmitted signal as it varies.

Receiver may use processing power or a heuristic to find and receive the transmitter encryption code or frequency, phase, or time schedule code, then use the time schedule code to more quickly receive subsequent transmissions AM radio phase shift common to both the transmitter and the receiver can be stored and compensated for partially, based on heuristic example.

An embodiment of a device and method is envisioned wherein an accurate clock source can be used to amplify or detect a very weak signal, especially one below the noise floor. Detection of the signal is by a coherent integration technique. This is facilitated if the weak signal is also very accurate in terms of low Allen Deviation, or if a varying but using a common clock source.

However, if it is not as accurate and varies, typically it varies in a semi-predictable, known, estimated, or substantially estimated in a heuristic fashion. This may be because Its variation is constrained. It does not randomly jump from frequency to frequency. Thus, a heuristic, linear extrapolation, interpolation, or non-linear extrapolation or linear interpolation can be used to determine how the clock source varies. For example, a typical crystal oscillator is known to vary with temperature. The constraints allow T&E enhancement more quickly while using less processing power.

Other enhanced T&E approaches include trying a range of frequencies slightly higher and slightly lower than the current ref frequency. As received the frequency changes. A better match better match indicates the frequency difference and a better fixing of the new reference frequency.

It should be noted that other methods of coherent and non-coherent integration are also contemplated, however the methods described herein very computationally efficient for CPU processing time, FPGA processing energy, or memory efficiency than other methods.

A similar or common problem may exist in finding a weak signal modified but of a semi-fixed frequency buried in noise. The signal may be modified by phase or doppler frequency shift. The doppler shift can be caused by reflection off the ionosphere, transmission of reception from a moving vehicle, or unmanned aerial vehicle (UAV). Also, the doppler shift can be caused by a fixed transmitter and a moving receiver. Both transmitter and receiver may be moving causing a doppler shift. Either transmitter or receiver may move briefly potentially causing a 'permanent' phase shift depending on wavelength and relative distance and direction moved between them. A frequency shift of a crystal oscillator may be caused by temperature, humidity, surface adsorption, desorption, pressure, vibration, magnetic field, electric field, load, driving electronics changes, load capacitors changes, load stability, voltage supply stability, and radiation. Any knowledge of the constraints' behavior can be used to decrease processing power and/or time trade-off and 'find' the signal faster.

Knowledge of constraints may include long-term aging, short term stability, mechanical stress, vibration or shock, gravitational orientation, acceleration, and deceleration also effect the oscillator frequency.

A stationary intentional or unintentional transmitter relying on a crystal for its local oscillator similarly may shift in frequency as its surrounding temperature changes or its self-heats internally due to operation when turned on and drawing current and power.

All of the above can be detected with more sensitivity using the approach described herein.

A whole acquisition period of ADC digitized data may be stored in memory and processed, or it may be continually processed by coherent integration. Different parts of the acquisition or different lengths of the acquisition may be separately processed. The best fit or highest amplitude result for the coherent integration is considered and chosen as representing the input signal buried in the noise. The phase shift pattern used to generate the best fit thus may be used to represent or determine the movement of 502.

The frequency change constraints limit the search space, thus saving time. Knowing the Allen deviation of a crystal used in an oscillator for example may be a constraint Multiple—Amps using multiple—DDS, MMCM or PLLs may be advantageously used to listen on multiple channels simultaneously.

A quadcopter may be better sensed, by predict its LO frequency range by temperature, extrapolation of frequency and phase over time, max acceleration, or other extrapolative or interpolative constraints.

Performing geolocation or devices or IEDs may also be enhanced in this manner, by enhancing the their source signals.

Prefilters such as LC bandpass filters of bandwidth under 100 KHz, or crystal prefilters of bandwidth under 5 KHz may be used eliminate strong interferers, potentially adversely saturating an ADC.

It is to be noted that given the pattern or some elements of knowledge of constraints of the pattern of spread-spectrum clock generation (such as deviation limit in frequency), these can be match it to extract the signal upon which it is based more clearly.

In other words, it can be said that clock characteristics (ex. frequency drift) of weak transmitter may be matched to receive the signal with low SNR.

The invention can also be considered to be another way of filtering a signal to eliminate other unwanted signals and determine if a specific signal is present. This typically means the specified frequency and phase or phase drift limitation per unit of time.

The invention may be implemented in a satellite, wherein the doppler shift of a signal of interest on the ground or in space is compensated for by knowing or constraining the satellites' location, speed, path, or received signal approximate expected frequency.

It should be noted that given a broadband signal receive chain, the invention can also identify a non-sinusoidal repeating wave pattern which contains many frequencies from a noisy signal.

It is contemplated that one or more noise transmitter be made to add noise deliberately to the signal. It may be a separate noise transmitter and located at a separate location to hide the location source of the true intended information transmitter. It is contemplated this noise transmitter would also be received and receivable by the intended receiver. It is further contemplated that a deliberately constructed clock transmitter transmitting at one of more frequencies different from the information intended transmitter may be received by the intended transmitter and be used to transmit a signal which can be used as a basis for the phase coherent, phase correct information transmitter. The intended receiver or receivers also use the deliberately constructed clock transmitter to create their internal frequency and phase for extracting the intended signal from the noise.

The noise transmitter and clock transmitter may be located in the same device and transmit from the same location. A predetermined schedule method may be chosen to switch between multiple clock frequencies on a predetermined pattern basis to foil interlopers. Alternatively, a schedule may be transmitted to dynamically change choice of clock transmitters used.

Now, the subject matter will be described in a further reference to Figures.

FIG. 1A illustrates a waveform transmitted as an 8 bit message with a 1 second duration for each bit, as described above.

Figure 1B:
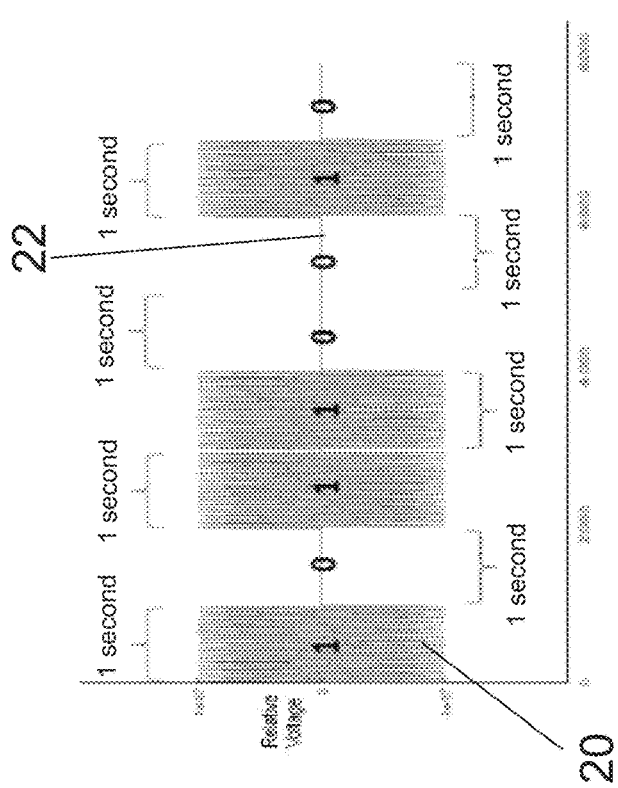
FIG. 1B illustrates a waveform transmitted as an 8 bit message with a 2 second duration for each bit.

FIG. 1B illustrates a waveform transmitted as an 8 bit message with a 2 second duration for each bit, as described above.

Figure 2A:
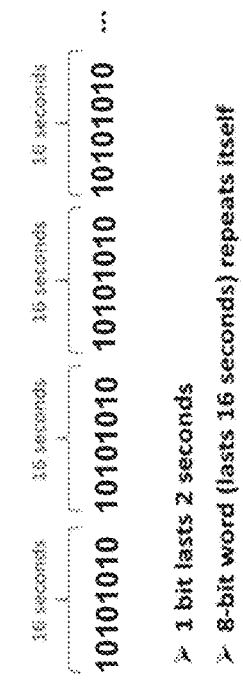
FIG. 2A illustrates a wavetrain of the waveform of FIG. 1A.

FIG. 2A illustrates a wavetrain of the waveform of FIG. 1A, as described above.

Figure 2B:
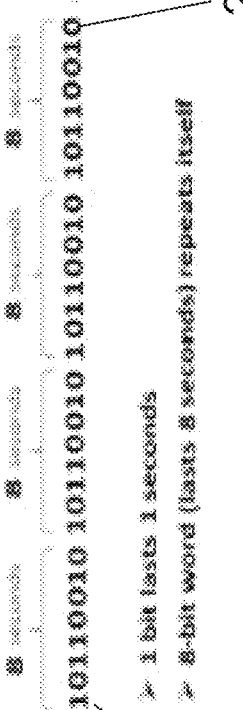
FIG. 2B illustrates a wavetrain of the waveform of FIG. 1B.

FIG. 2B illustrates a wavetrain of the waveform of FIG. 1B, as described above.

Figure 3:
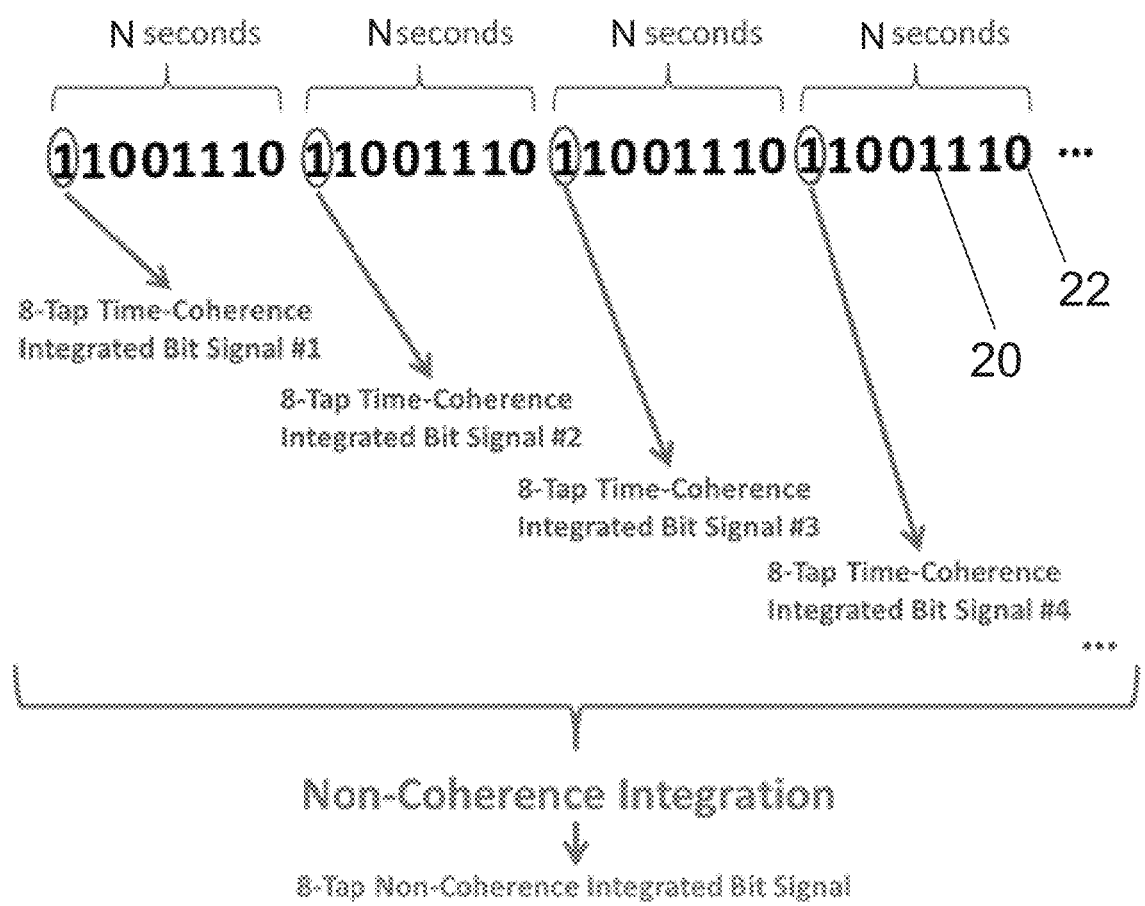
FIG. 3 illustrates a signal with phase and or frequency variations coming from a transmitter.

FIG. 3 illustrates a strong signal with phase and or frequency variations coming from a strong transmitter, and a weaker transmitter, and said strong signal although with phase and or frequency variations being eventually received to be used as a as a time base by a weaker transmitter and said strong signal received to also be used as a as a time base by a receiver to allow the receiver to better receive the weaker transmitter's signal, both transmitter and receiver sharing and using the same time base signal although possibly at different times and thus different sections of the time base signal as there is a time delay incurred by the receiver of the time base embedded in the transmitter's signal.

Figure 4:
FIG. 4 illustrates a 2 second bit to an 8 tap integration.

FIG. 4 illustrates a 2 second bit to an 8 tap integration, an intentional or unintentional rf emission changing frequency and/or phase relative to a receiver. The change may be, but is not limited to, doppler shift due to relative motion between the two, and/or the local oscillator of the transmitter drifting. FIG. 4 also shows the reference oscillator used by the ASIC being varied to match the change in the received emission.

Figure 5:
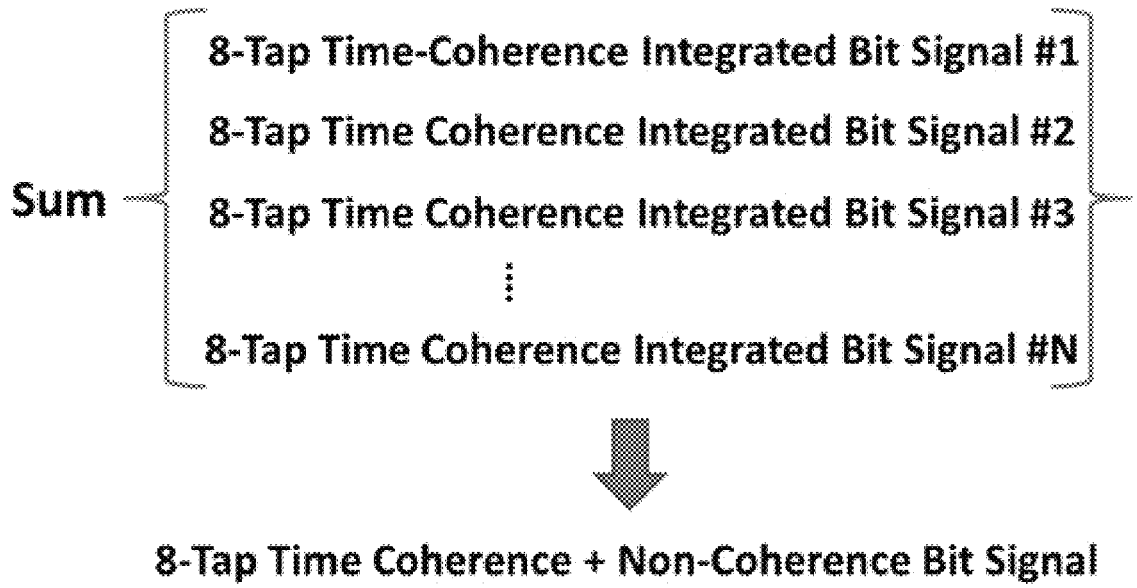
FIG. 5 illustrates a n-bit integration.

FIG. 5 illustrates a n-bit integration.

FIG. 6A illustrates a graph of a bit 1 cycle.

FIG. 6B illustrates a graph of a bit 0 cycle.

FIG. 7 illustrates a graph of 8 bits in one cycle.

Figure 8:
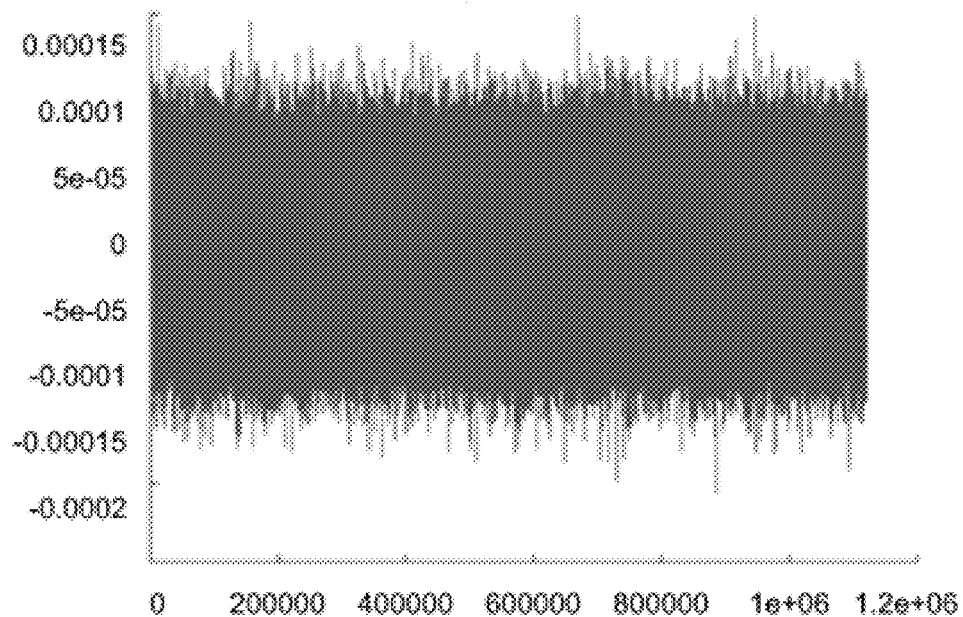
FIG. 8 illustrates a graph of 2 second sinusoidal signal with gaussian noise without a phase shift.

FIG. 8 illustrates a graph of 2 second sinusoidal signal with gaussian noise without a phase shift.

Figure 9:
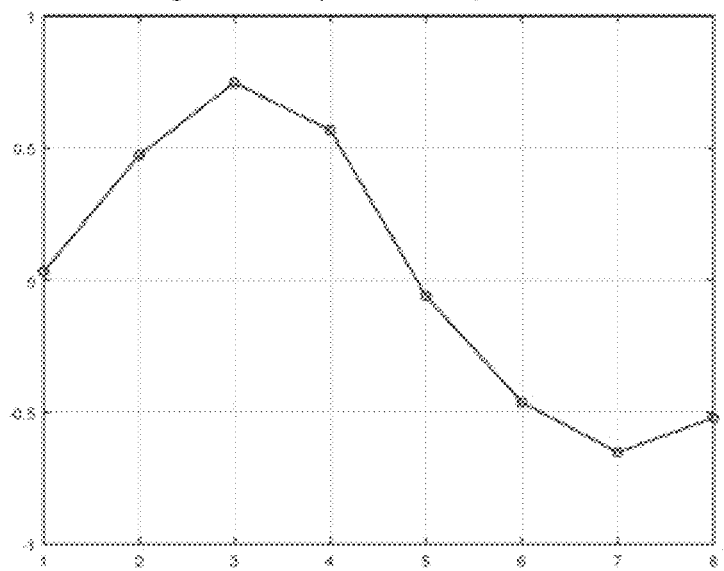
FIG. 9 illustrates a graph of noncoherent integration of the signal of FIG. 8 with 50 loops.

FIG. 9 illustrates a graph of noncoherent integration of the signal of FIG. 8 with 50 loops.

Figure 10:
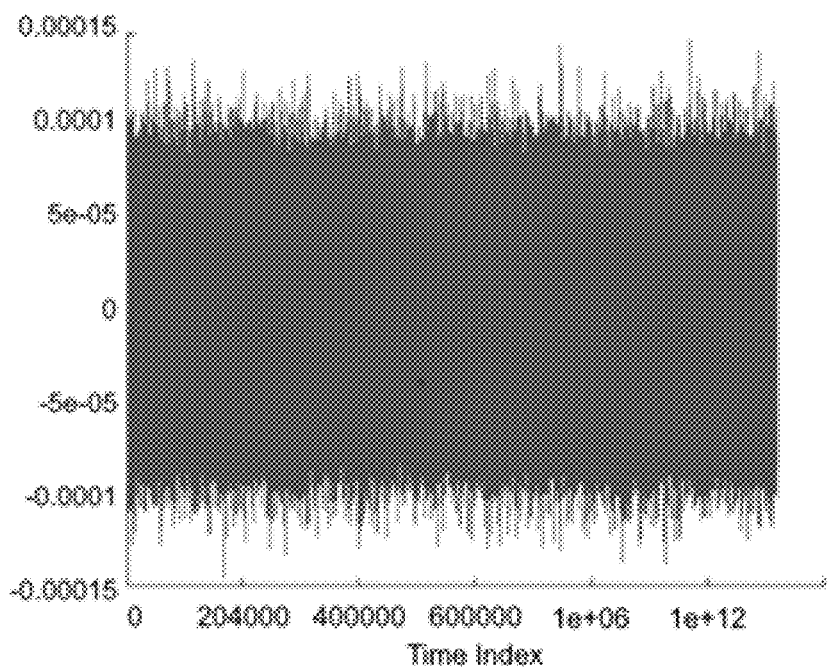
FIG. 10 illustrates a graph of 2 second sinusoidal signal with gaussian noise with a phase shift.

FIG. 10 illustrates a graph of 2 second sinusoidal signal with gaussian noise with a phase shift.

Figure 11:
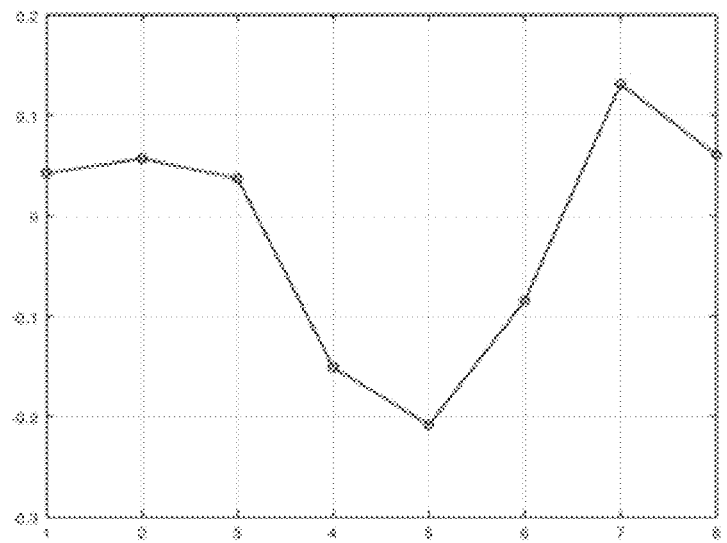
FIG. 11 illustrates a graph of noncoherent integration of the signal of FIG. 10 with 50 loops.

FIG. 11 illustrates a graph of noncoherent integration of the signal of FIG. 10 with 50 loops.

Figure 12:
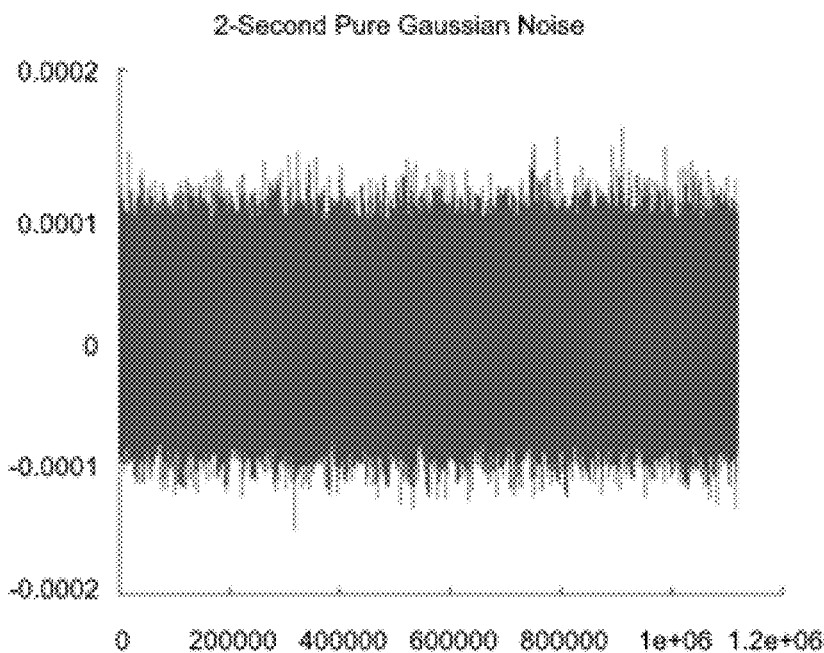
FIG. 12 illustrates a graph of 2 seconds of pure gaussian noise.

FIG. 12 illustrates a graph of 2 seconds of pure gaussian noise.

Figure 13:
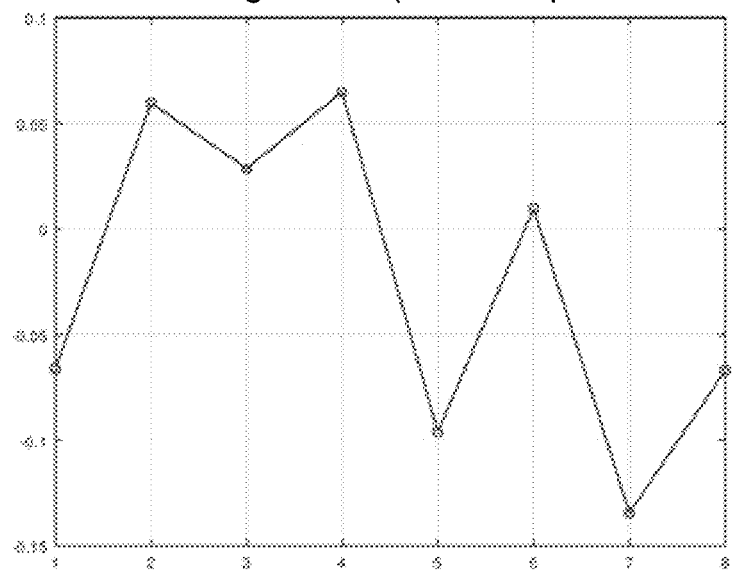
FIG. 13 illustrates a graph of 2 second noncoherent integration of the signal of FIG. 12.

FIG. 13 illustrates a graph of 2 second noncoherent integration of the signal of FIG. 12.

Figure 14:
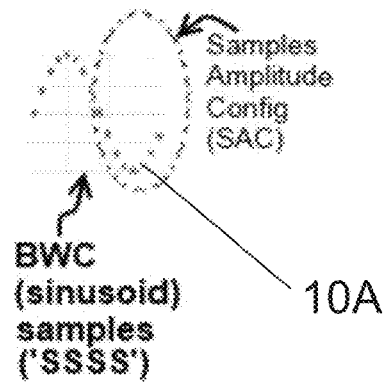
FIG. 14 illustrates a sinusoidal waveform sample.

FIG. 14 illustrates a sinusoidal waveform sample 10.

Figure 15:
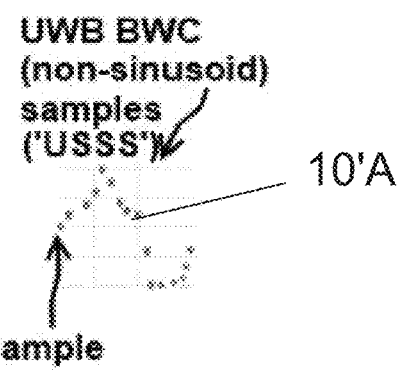
FIG. 15 illustrates a non-sinusoidal waveform sample.

FIG. 15 illustrates a non-sinusoidal waveform sample 10'A.

Figure 16:
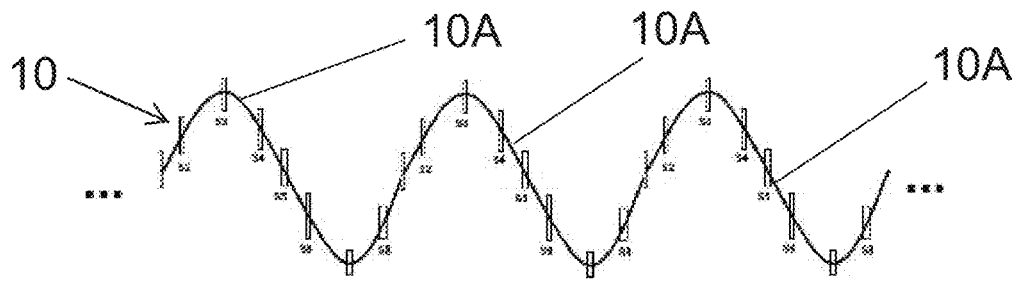
FIG. 16 illustrates a sinusoidal wavetrain.

FIG. 16 illustrates a wavetrain 10, comprising a series of waveforms 10A of a sinusoidal form, as seen inside BDP. Particularly, the sinusoidal BWC is constructed from 8 sample points.

Figure 17:
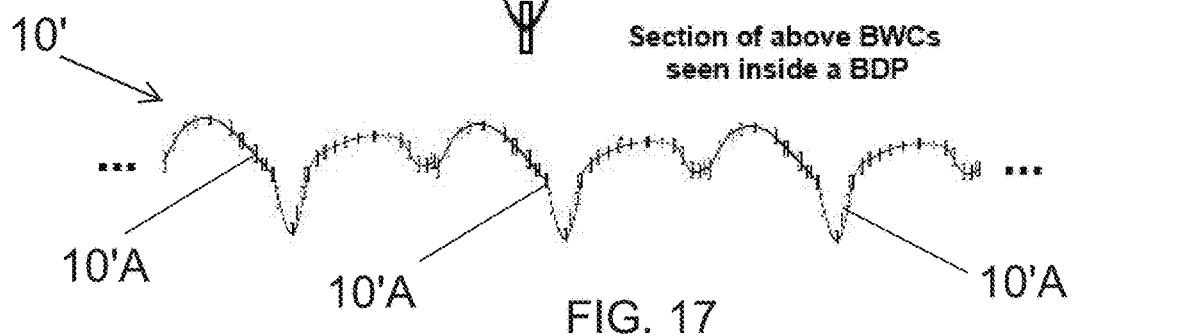
FIG. 17 illustrates a non-sinusoidal wavetrain.

FIG. 17 illustrates a wavetrain 10', comprising a series of waveforms 10'A of a non-sinusoidal form, as seen inside EDP. Particularly, the non-sinusoidal BWC is constructed from 27 sample points.

Figure 18:
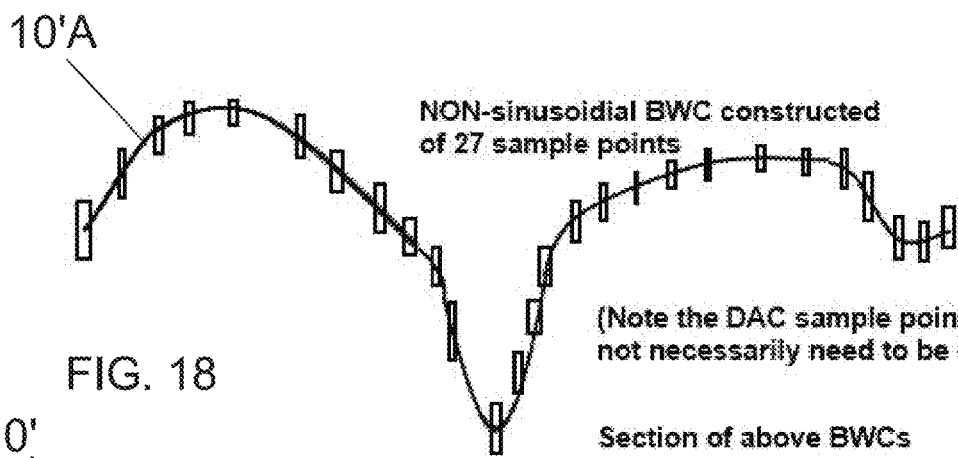
FIG. 18 illustrates a non-sinusoidal waveform.

FIG. 18 illustrates a non-sinusoidal waveform 10'A.

Figure 19:
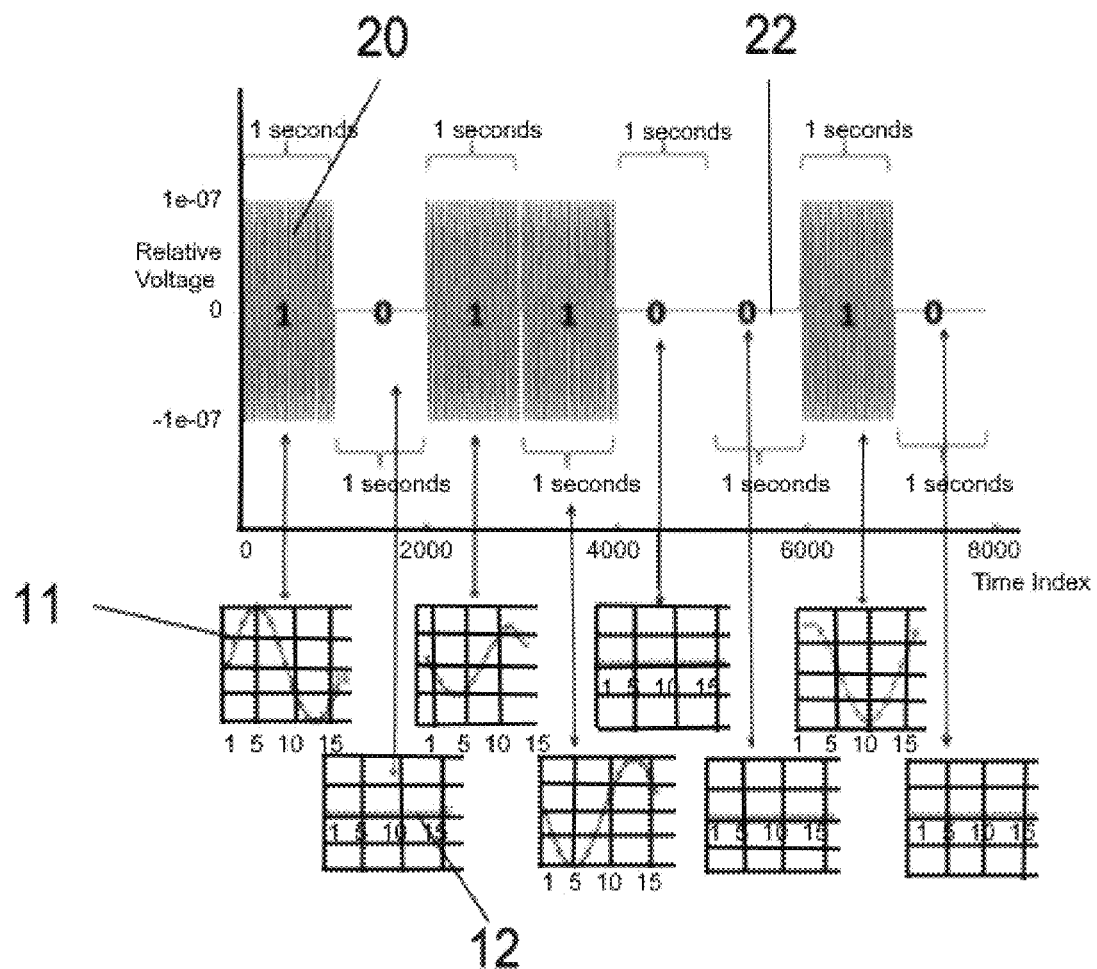
FIGS. 19 illustrates a waveform.
Figure 20:
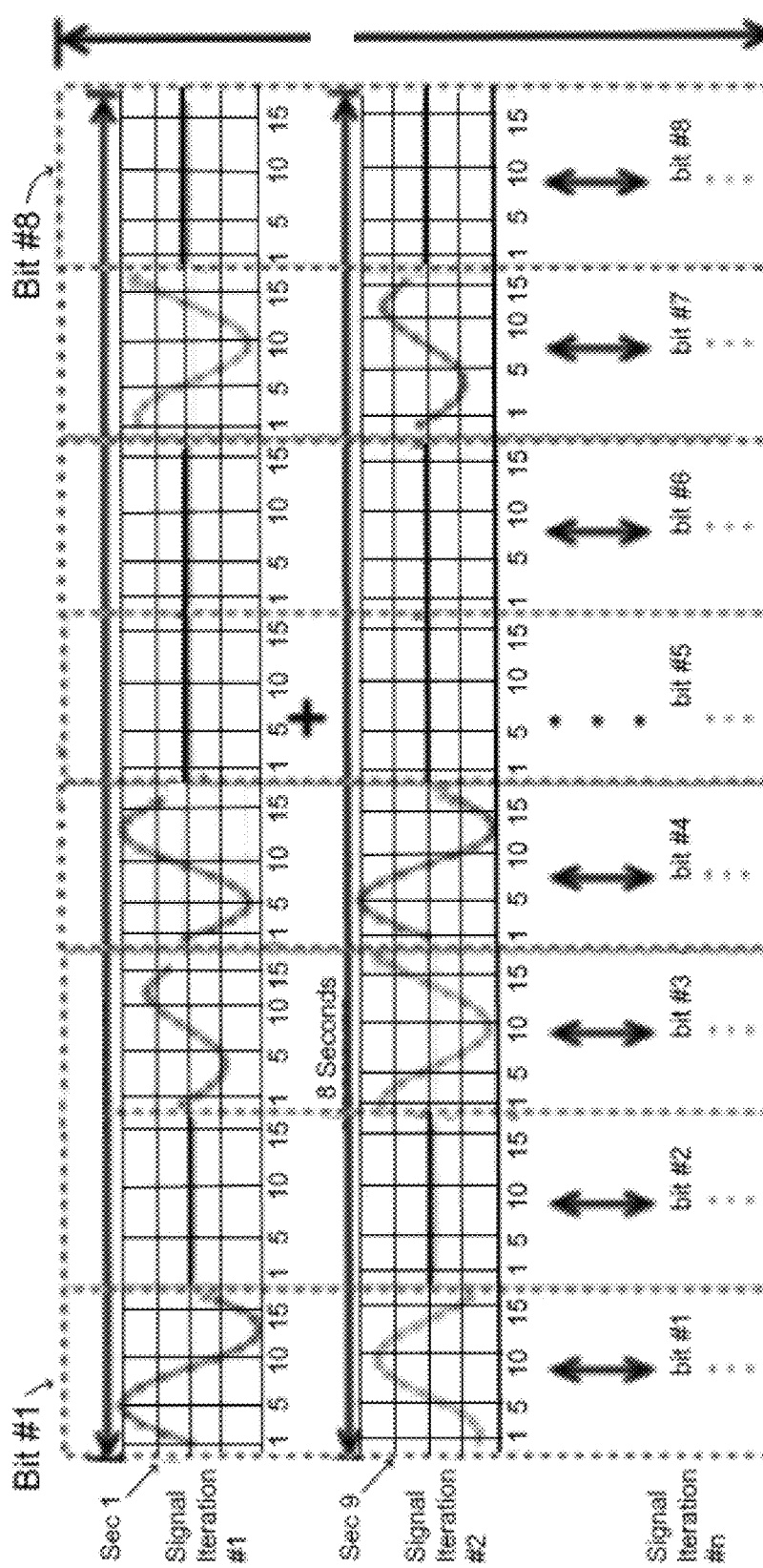
FIG. 20 illustrates signal iterations of the waveform of FIG. 19.
Figure 21:
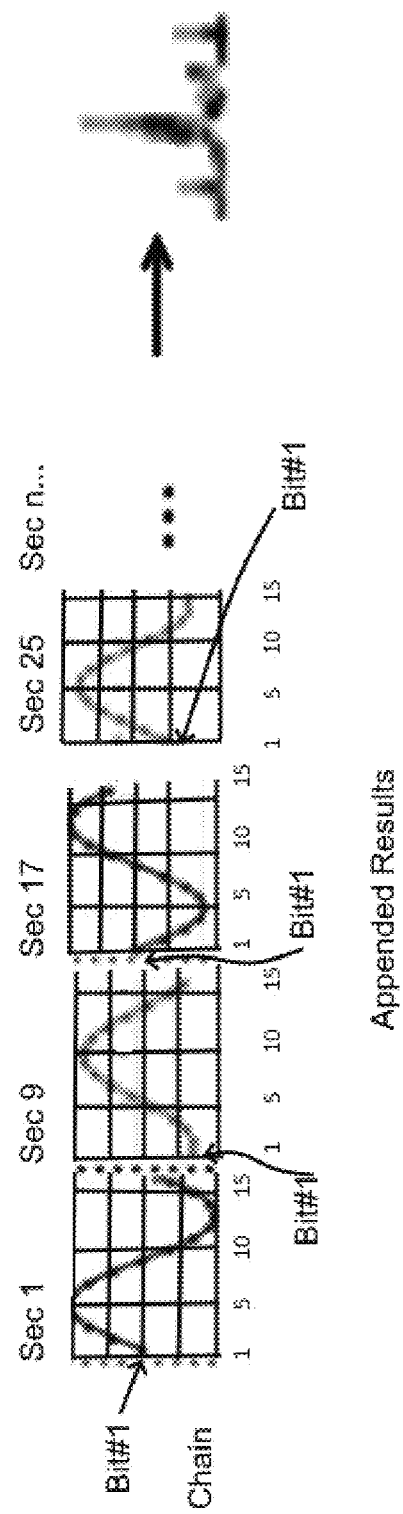
FIG. 21 illustrates appended results of a single bit within the waveform of FIG. 19.

FIGS. 19-21 illustrate processing of the 8-bit waveform signal 10, as described above, broken down into the segments 11, representing "1" and segments 12, representing "0".

Figure 22A:
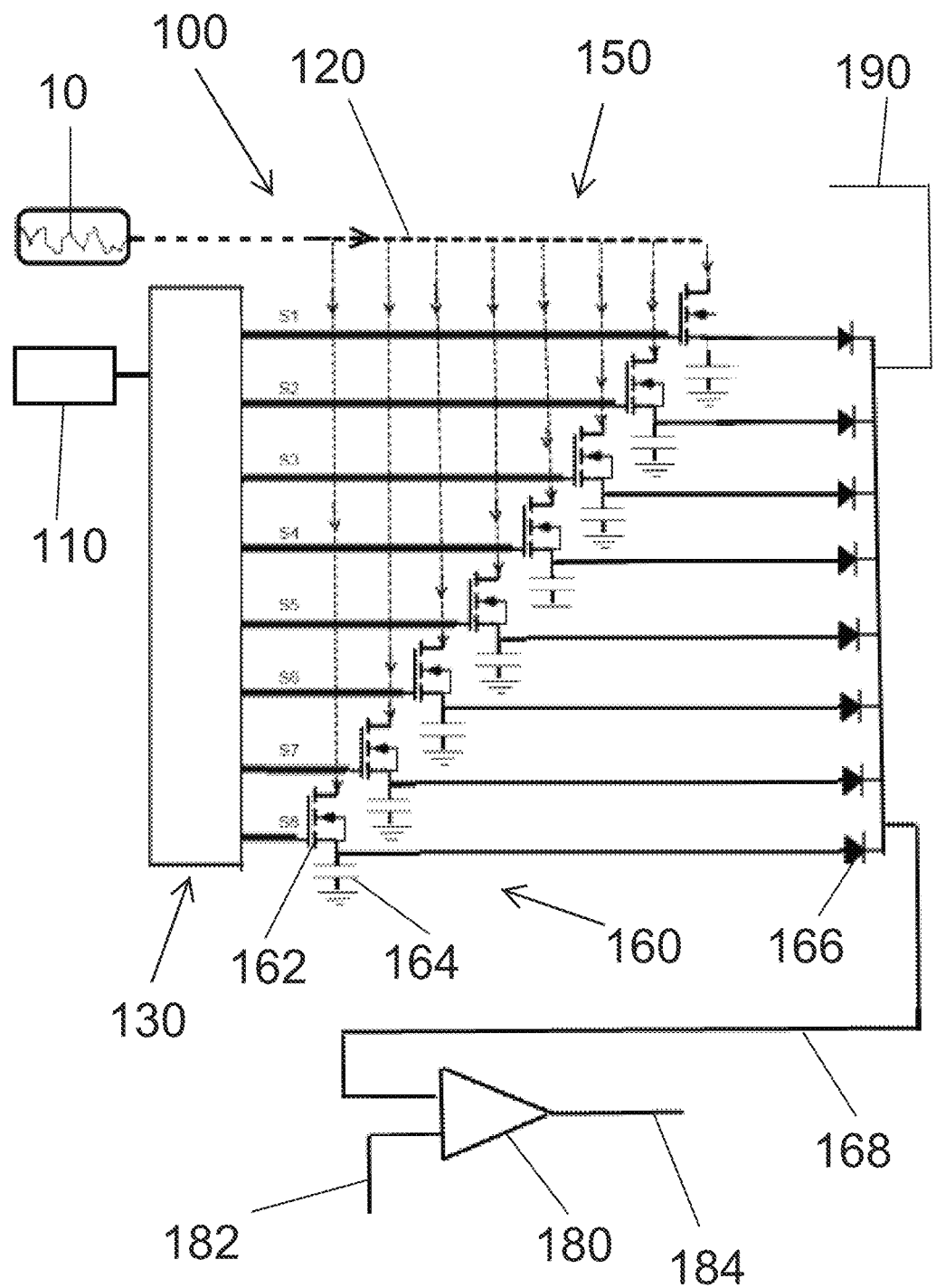
Figure 30:
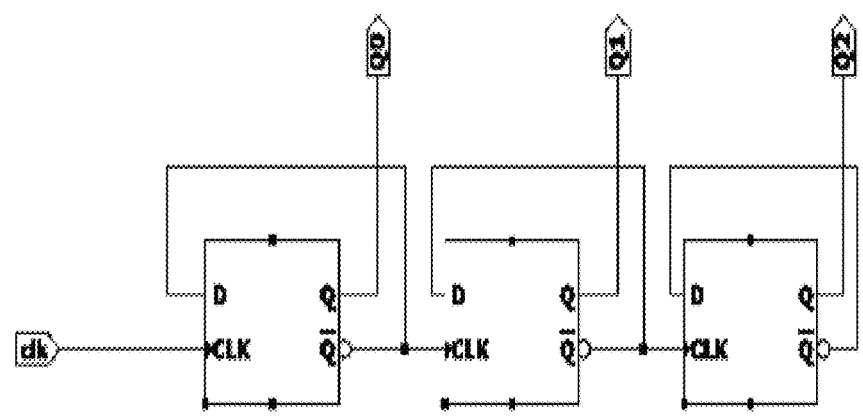
FIG. 30 illustrates a 3 bit counter.
Figure 31:
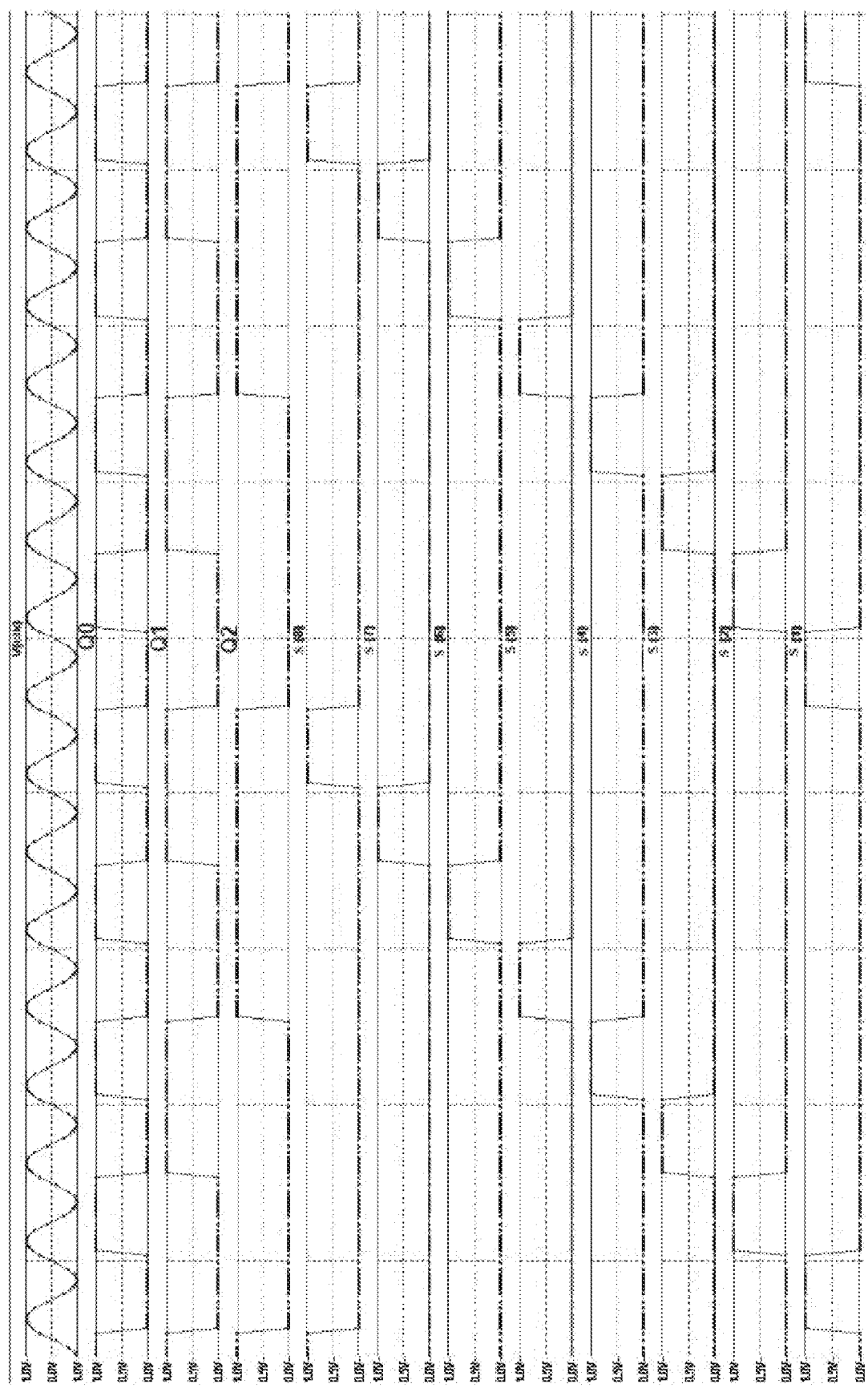
FIG. 31 illustrates a voltage sampling processing.

FIG. 22A illustrate a receiver 100 designed to receive and process radio frequency transmission 10. The receiver 100 includes a clock source 110, as described above, an input 120, as described above, a time location reference circuit 130, as described above, and a signal processing circuit 150, as described above 3 of 8 Decoder circuit is shown in FIG. 29, 3 bit counter is shown in FIG. 30 and the sampling processing is shown in FIG. 31. The voltage integrator circuit is referenced with reference numeral 160. As described above, the switch 162 is coupled to each of a respective timed waveform reference location and the input 120, a capacitor 164 is coupled to each of the switch 162 and a around to integrate at least one of a voltage and a current flowing through the switch 162 from the input 120, and a diode 166. FIG. 22A also illustrates an optional comparator 180 that is connected to the signal processing circuit 150 and to the threshold voltage setpoint 182 to output parameter 184. The comparator 180 can be of a circuit type as shown in FIG. 26. FIG. 22A also illustrates a reset line 190.

Figure 22B:
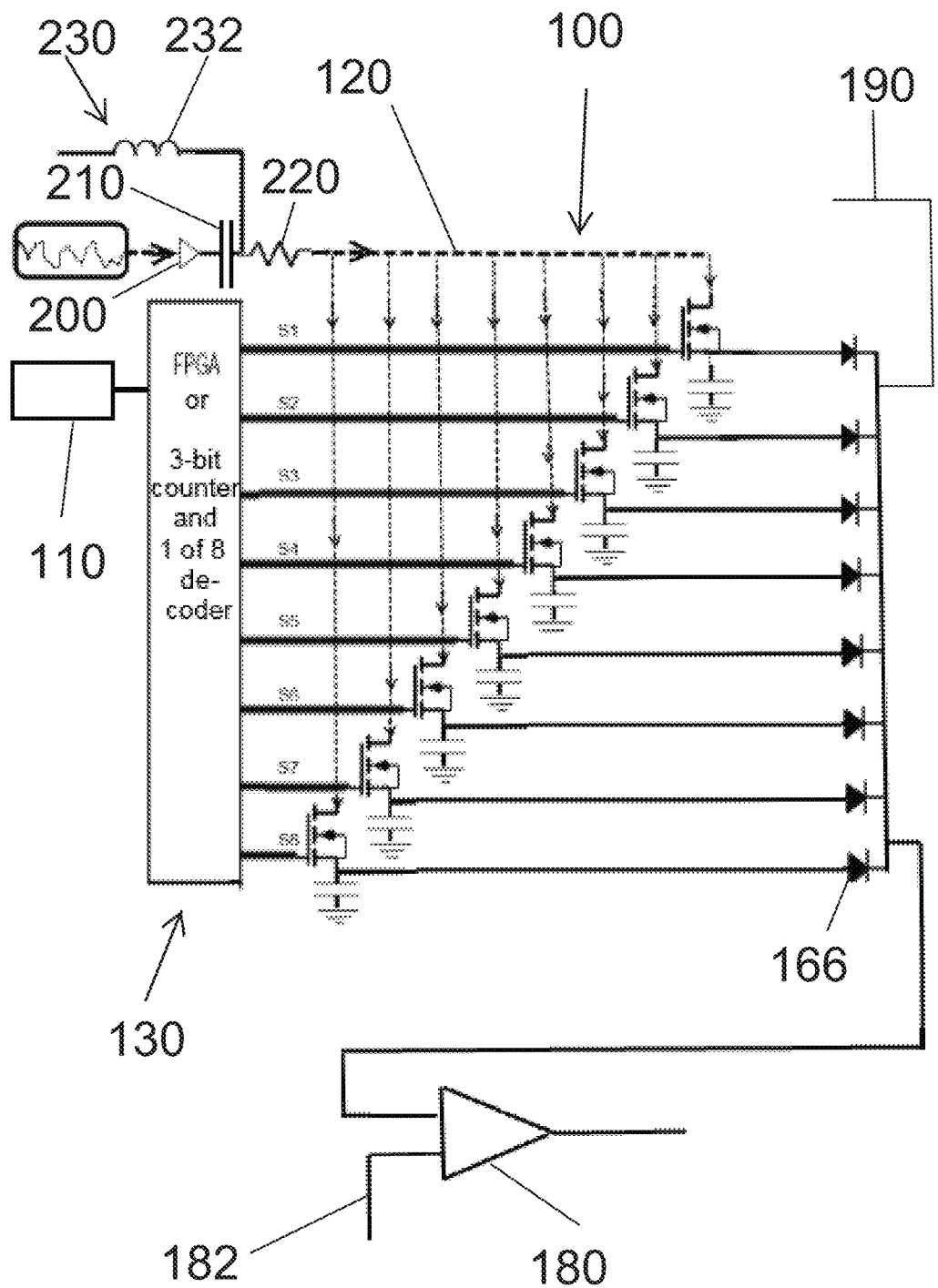

FIG. 22B illustrates the receiver 100 of FIG. 22A and also illustrates the optional amplifier 200, a capacitor 210, resistor 220 and a bias circuit 230 with the coil 232.

Figure 22C:
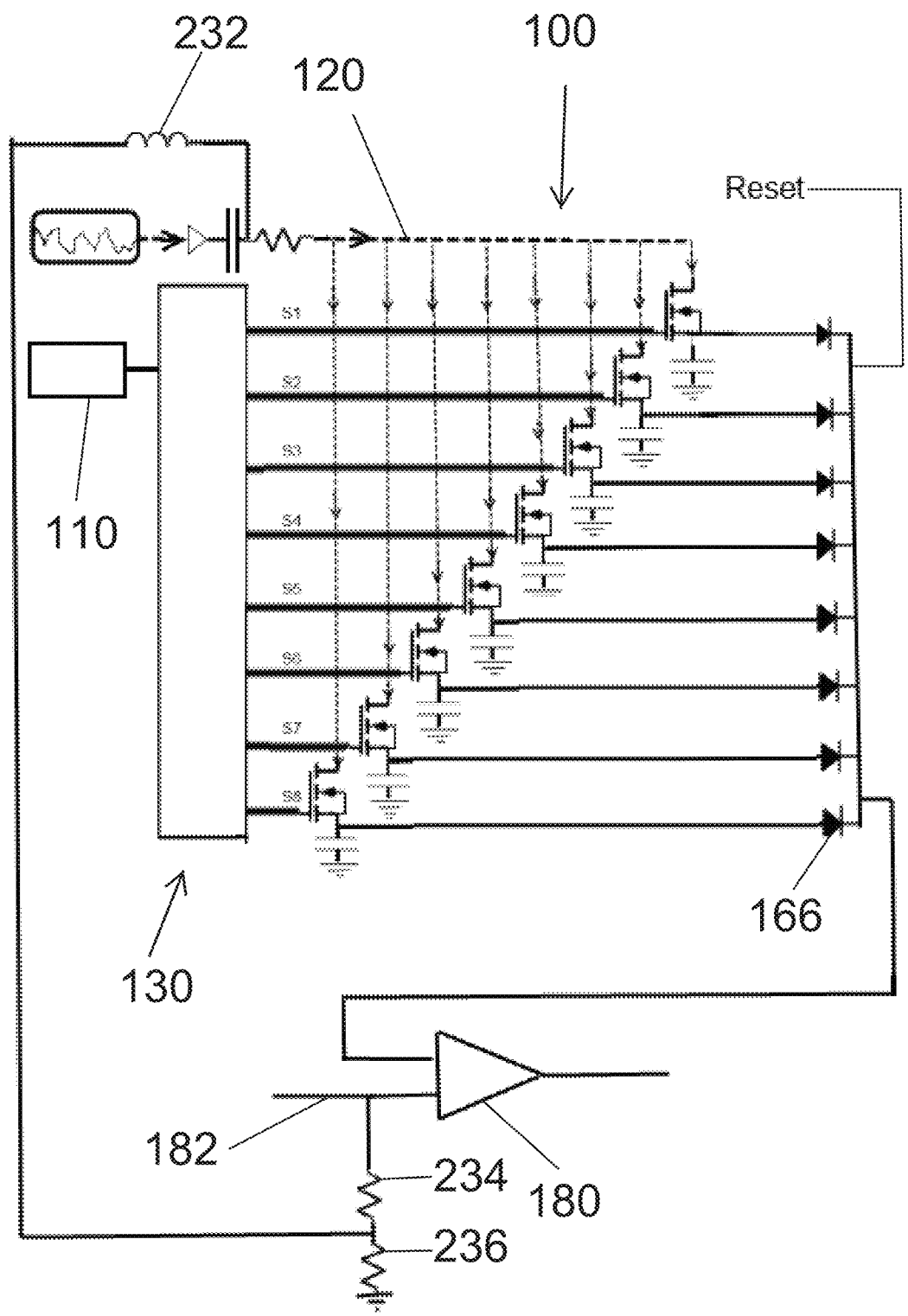

FIG. 22C illustrates the receiver 100 of FIG. 22B and also illustrates the resistor divider with resistors 234 and 236.

Figure 22D:
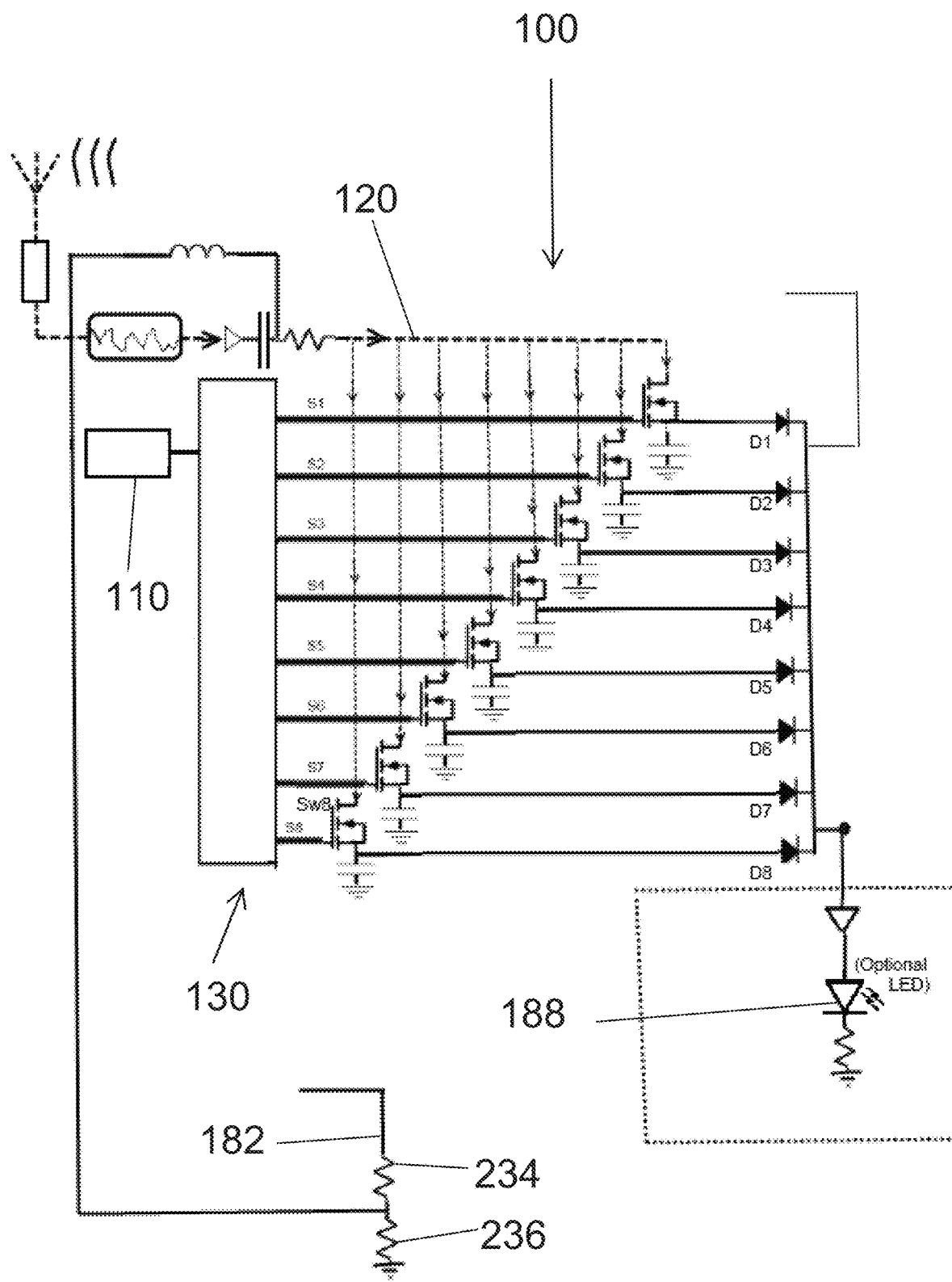

FIG. 22D illustrates the receiver of FIG. 22C, with the comparator 180 being replaced with am LED 188.

Figure 22E:
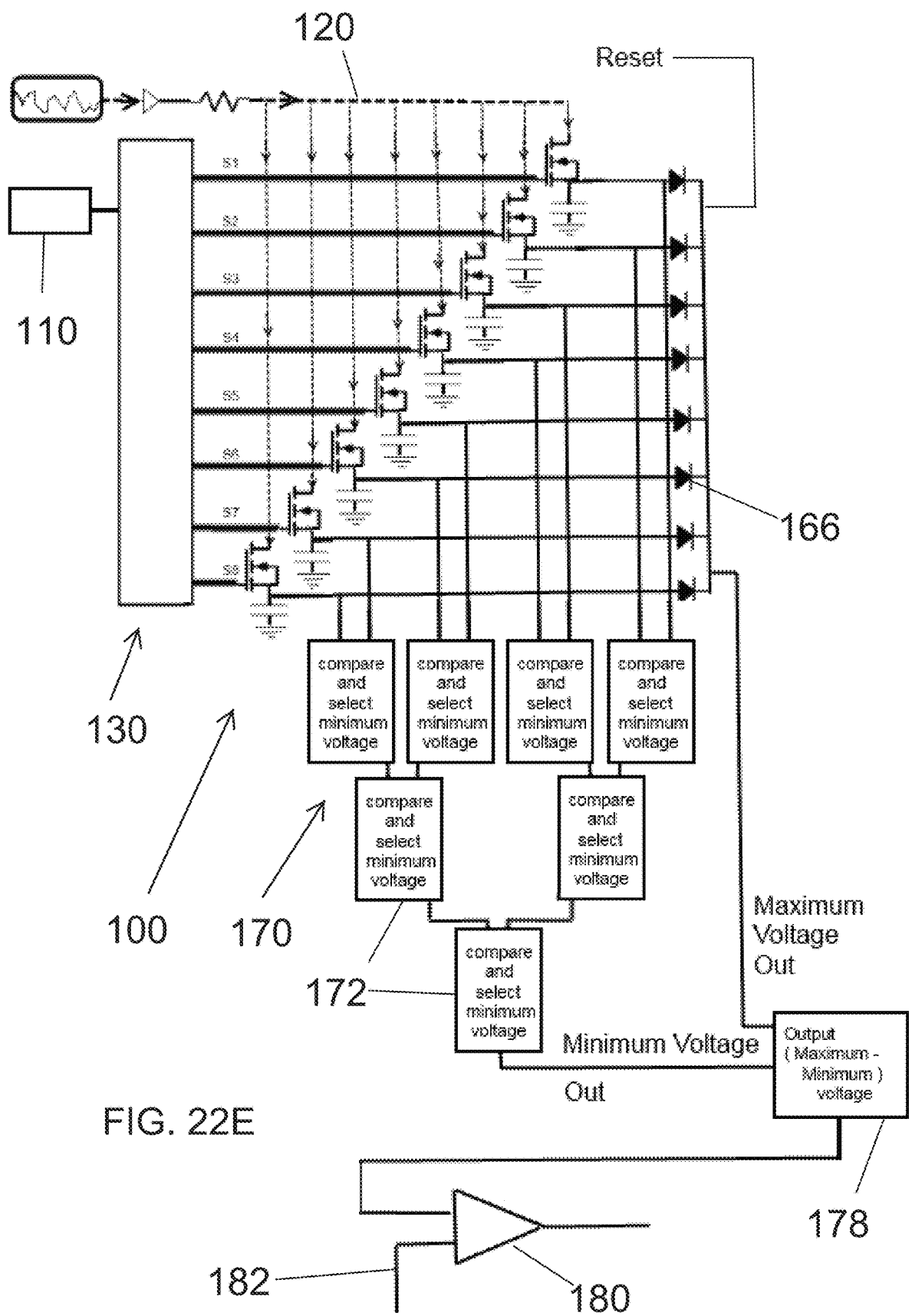

FIG. 22E illustrates the receiver 100 of FIG. 22B, where the signal processing circuit 150 is a first circuit designed to output maximum voltage and a second signal processing circuit 170 designed to output a minimum voltage through use of compare and select circuit 172 that is best shown in FIG. 27. The second circuit 170 may represent a form of non-coherent integration.

Figure 22F:
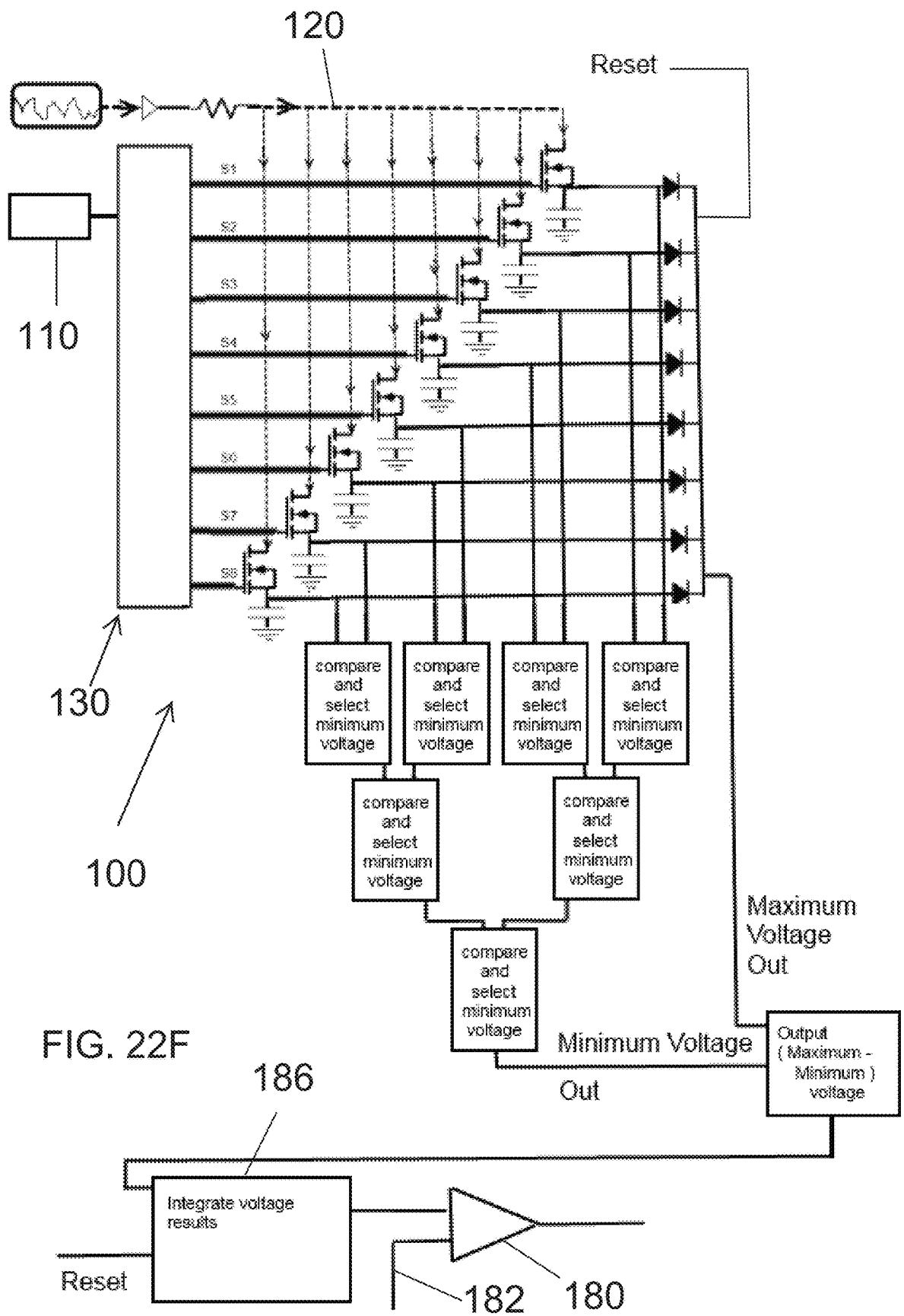

FIG. 22F illustrates the receiver 100 of FIG. 22E, where the difference between first and second voltages is integrated using the voltage integrator circuit 186 of FIG. 28 prior to receiving the integrated voltage at the comparator 180.

FIG. 22G illustrates the receiver of FIG. 22A, where the diode 166 is replaced with the analog-to-digital (ADC) converter 168.

Figure 22H:
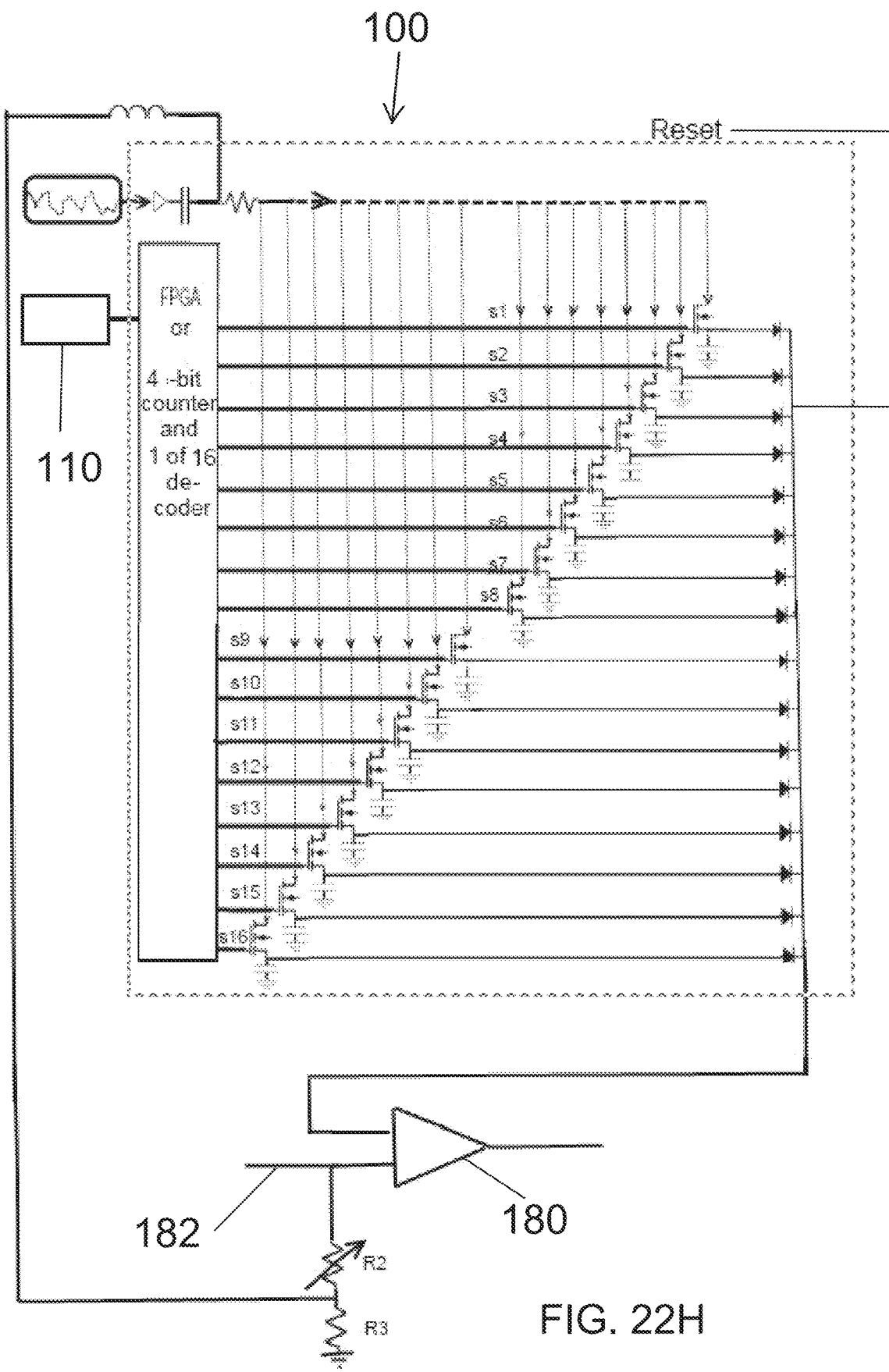

FIG. 22H illustrates the receiver 100 of FIG. 22D, designed to process a 16 bit signal.

Figure 22J:
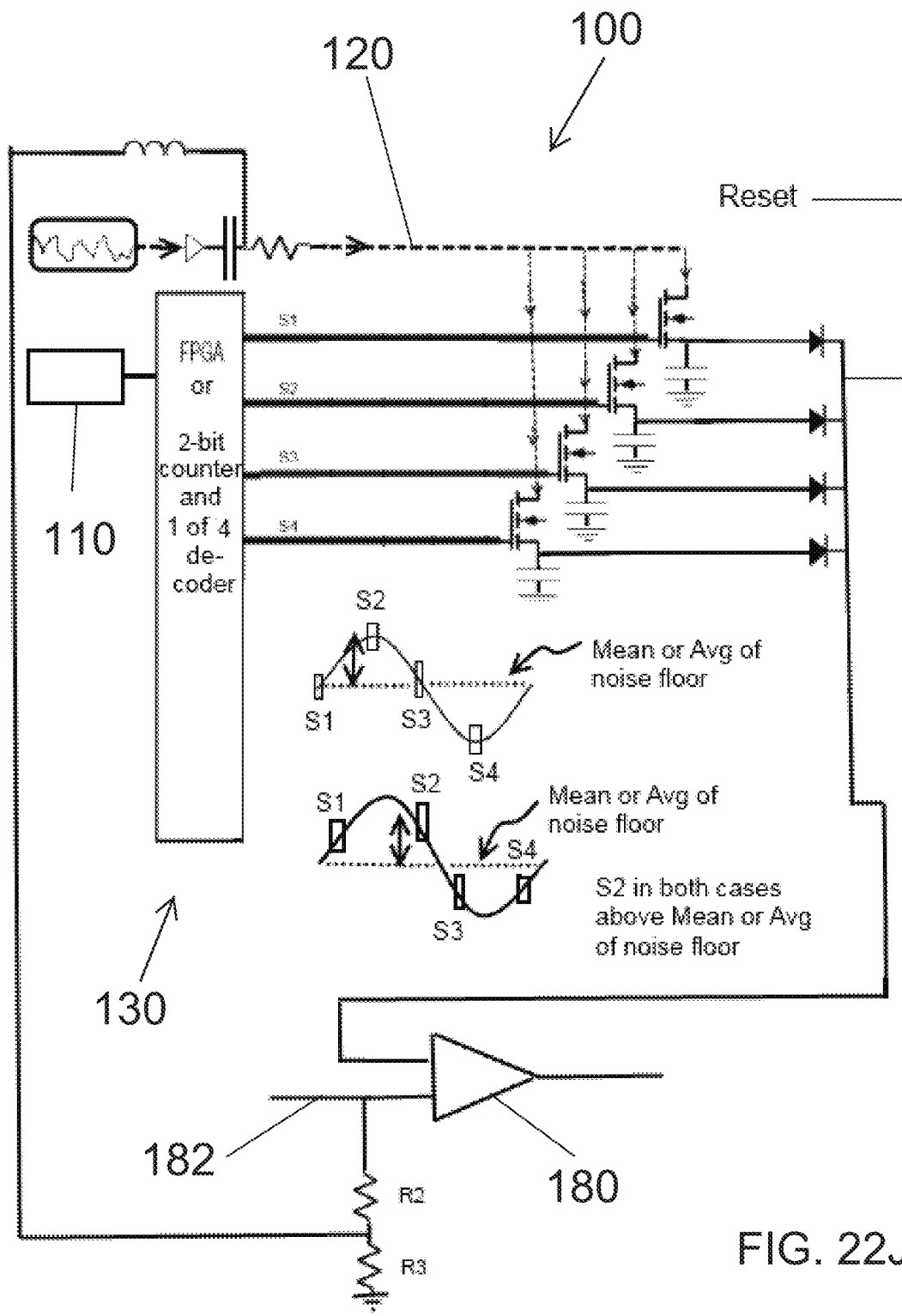

FIG. 22J illustrates the receiver 100 of FIG. 22D, designed to process a 4 bit signal.

Figure 23:
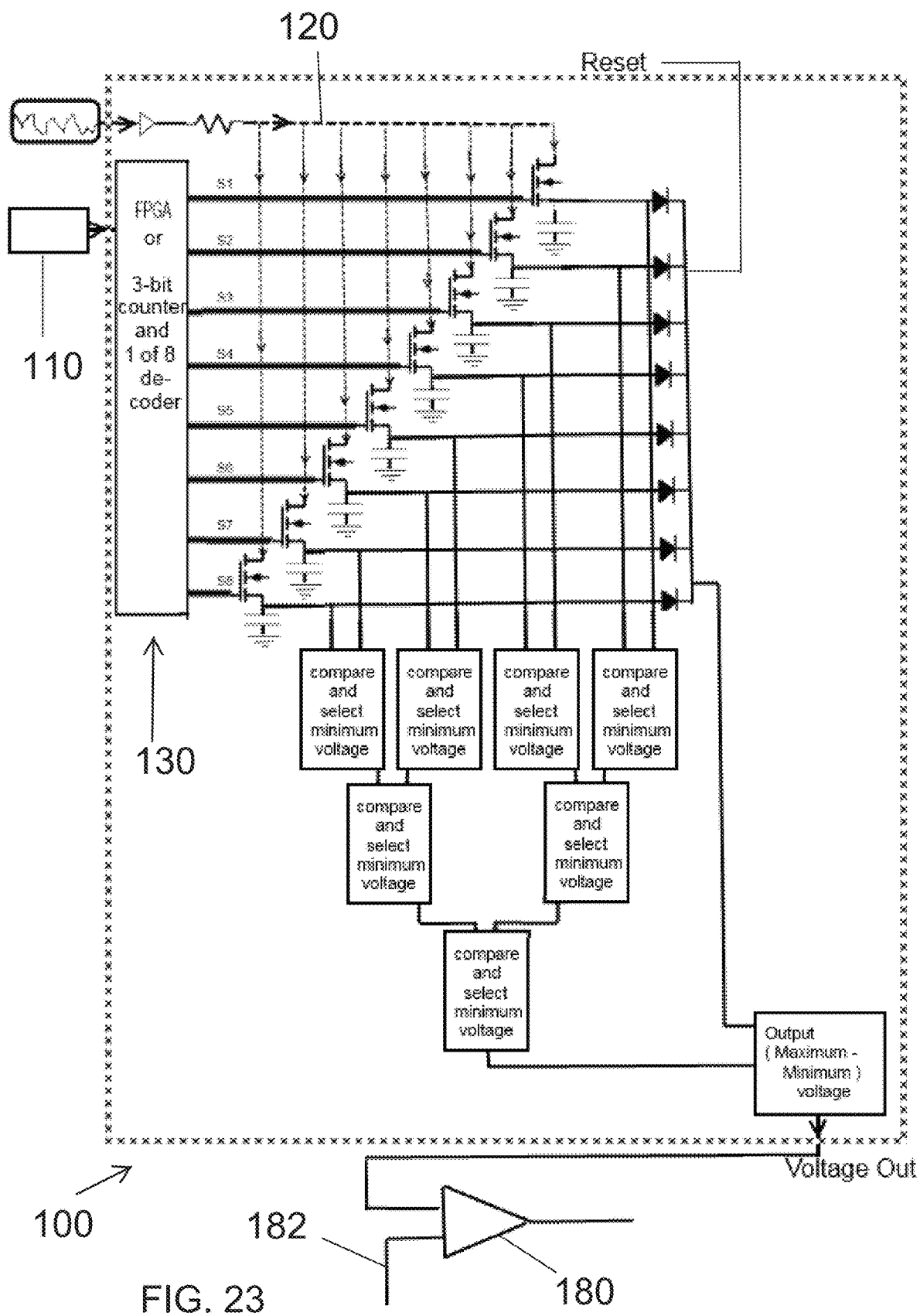
FIG. 23 illustrates a receiver.

FIG. 23 illustrates any receiver 100, as described above, and particularly illustrates a receiver 100 of FIG. 22E that can be considered as a module.

Figure 24:
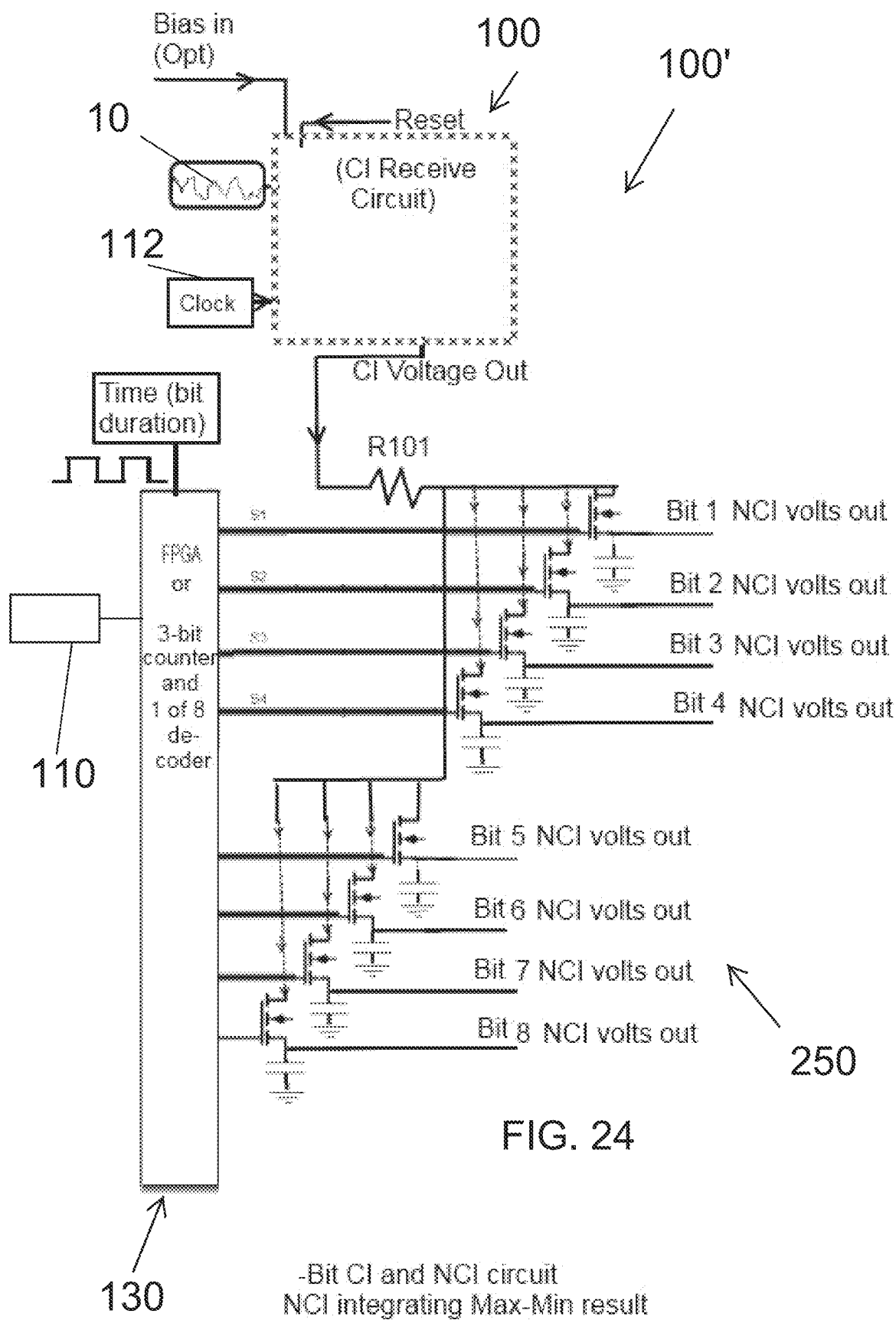
FIG. 24 illustrates a receiver.

FIG. 24 illustrates a receiver 100' that employs the receiver 100 in a combination with another clock distributor 130 and the voltage processing circuit 250 that can be constructed as the above described circuit 160. Clock or clock source 112 may be different than the clock source 110. Clock or clock source 112 may be slower than the clock source 110. Clock or clock source 112 may be Time-of-Day clock.

FIG. 25 illustrates a differential amplifier circuit.

FIG. 26 illustrates a comparator circuit.

FIG. 27 illustrates a voltage substraction circuit.

FIG. 28 illustrates an integrator circuit.

Figure 29:
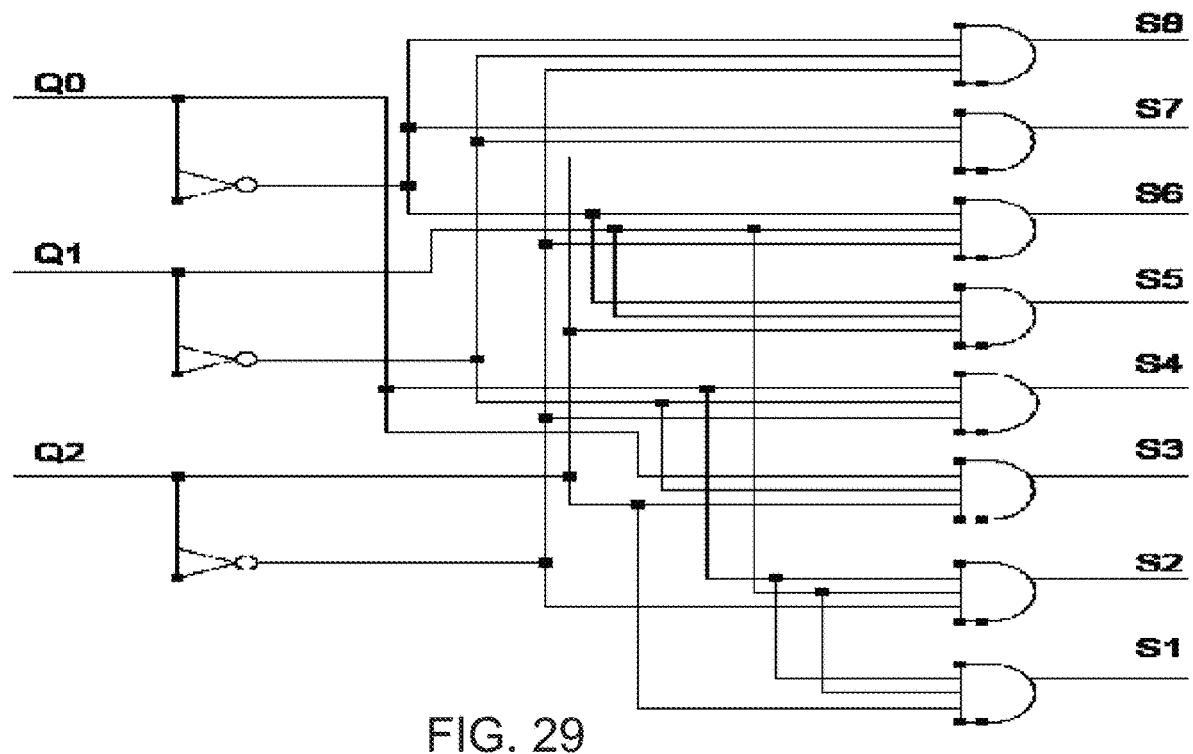
FIG. 29 illustrates a 3 of 8 decoder.

FIG. 29 illustrates a 3 of 8 decoder.

FIG. 30 illustrates a 3 bit counter.

FIG. 31 illustrates a voltage sampling processing.

Figure 32:
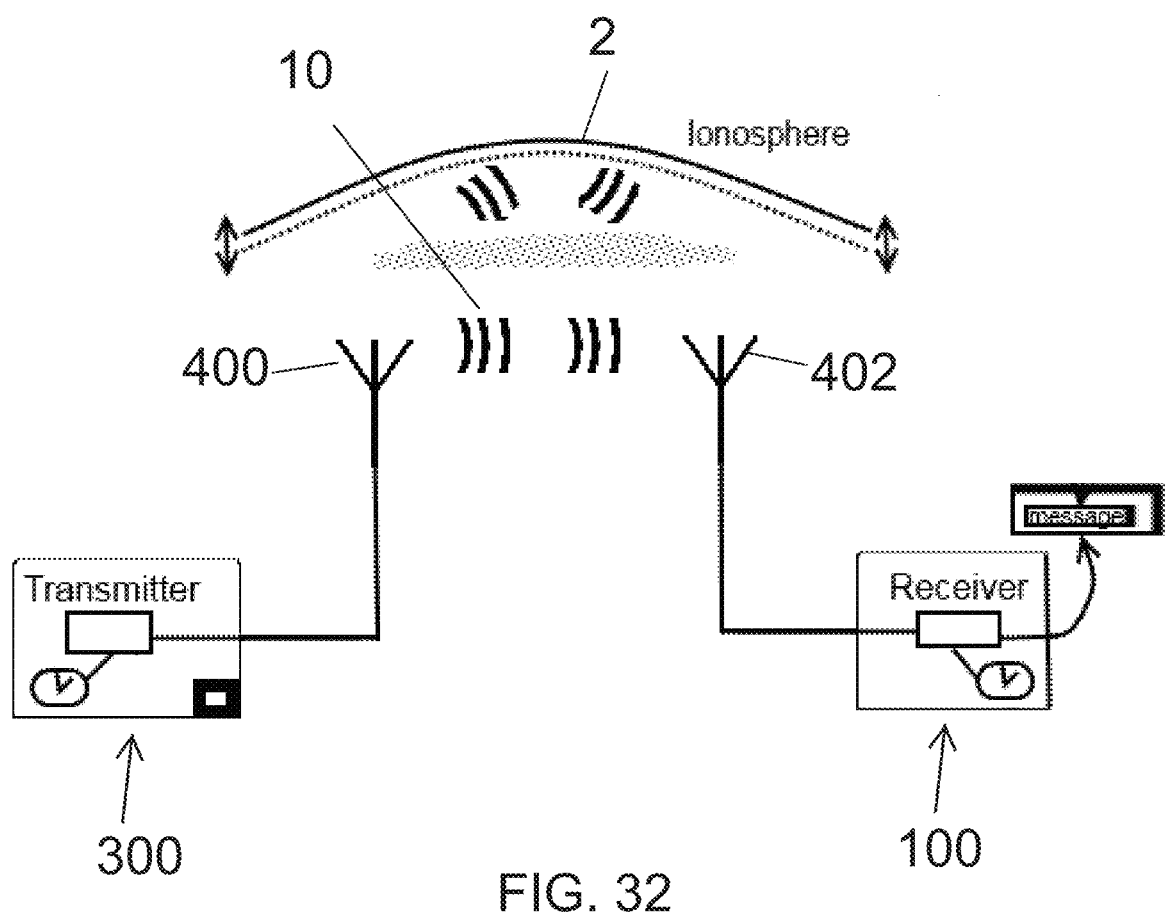
FIG. 32 illustrates a system of a receiver and a transmitter.

FIG. 32 illustrates a system of a receiver 100 and a transmitter 300, where the transmitter transmits the waveform signal 10 from the antenna 400 through the atmospheric layer medium 2 and where the waveform signal 10 is received at the antenna 402 to be processed at the receiver 100, as described above.

Figure 33:
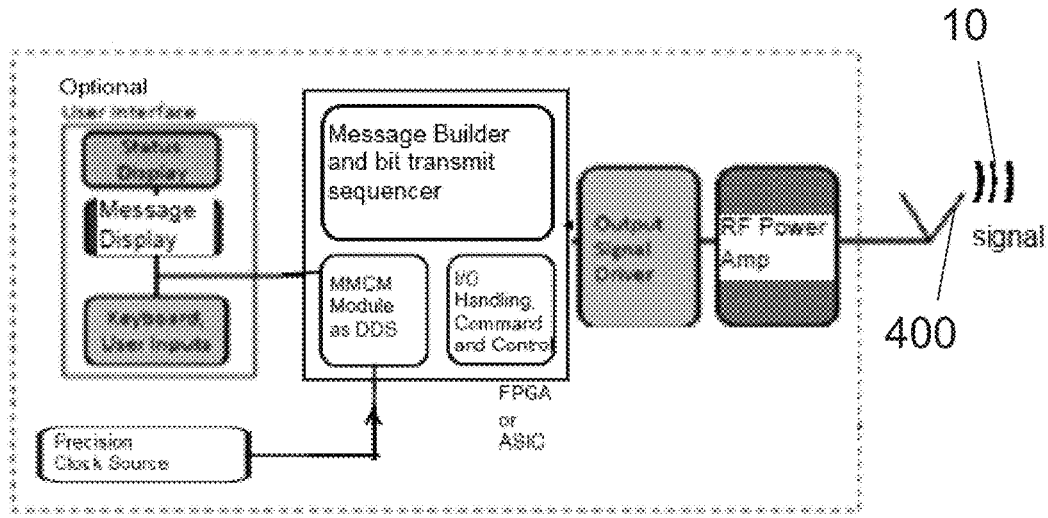
FIG. 33 illustrates a structure of the transmitter of FIG. 32.

FIG. 33 illustrates a structure of the transmitter 300.

Figure 34:
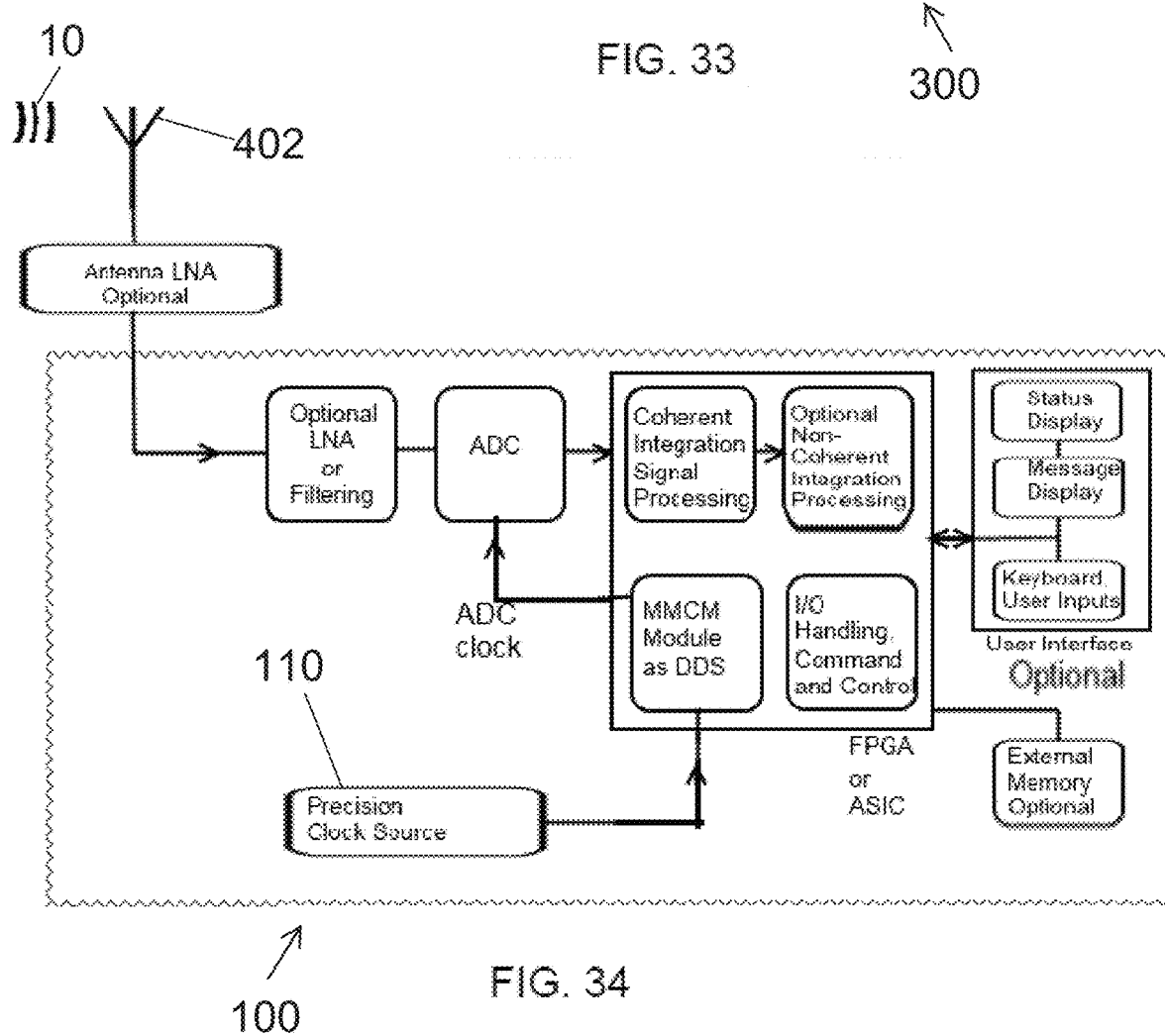
FIG. 34 illustrates a structure of the receiver of FIG. 32.

FIG. 34 illustrates a structure of the receiver 100, particularly when used for processing digital waveform signal.

A method of processing a signal transmitted as a waveform and encoding a message may include sequentially processing a plurality of voltage values from the signal at a plurality of time locations within the waveform; temporarily storing all processed voltage values; outputting a highest voltage value from the extracted voltage values; comparing the highest voltage value with a threshold voltage value; and determining a presence of the message if the highest voltage value exceeds the threshold voltage value. Sequentially processing the plurality of voltage values may include activating a plurality of switches with a time location reference circuit connected to a clock, each switch being associated with a time location from the plurality of time locations. Temporarily storing all extracted voltage values comprises electrically connecting a capacitor to each switch from the plurality of switches.

A method of processing a signal transmitted as a waveform and encoding a message may include outputting, with a coherent integration, a first voltage value from a plurality of voltage values within the signal at timed locations on the waveform; outputting, with a non-coherent integration, a second voltage value from the plurality of voltage values within the signal at the timed locations on the waveform; calculating a voltage difference value between the first voltage value and the second voltage value; and determining, based on the voltage difference, a presence or an absence of the message. Outputting the first voltage may include sequentially processing a plurality of voltage values from the signal at a plurality of time locations on the waveform; temporarily storing all extracted voltage values; and outputting the first voltage value as a highest voltage value from the processed voltage values. Outputting the second voltage may include using a plurality of voltage comparators, each voltage comparator from the plurality of voltage comparators outputting a difference between a pair of extracted voltage values, the second voltage defining a lowest voltage value from the processed voltage values.

In the present disclosure, many features are described as being, optional, e.g. through the use of the verb "may". For the sake of brevity and legibility, the present disclosure does not explicitly recite each and every permutation that may be obtained by choosing from the set of optional features. However, the present disclosure is to be interpreted as explicitly disclosing all such permutations. For example, an apparatus described as having three optional features may be embodied in seven different ways, namely with just one of the three possible features, with any two of the three possible features or with all three of the three possible features.

The chosen exemplary embodiments of the claimed subject matter have been described and illustrated, to pin and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and shapes are not intended to illustrate the precise shape of a region and are not intended to limit the scope of the present claims it will be understood that variations, modifications, equivalents and substitutions for components of the specifically described exemplary embodiments of the disclosure may be made by those skilled in the art without departing from the spirit and scope of the disclosure as set forth in the appended claims.

Any element in a claim that does not explicitly state "means for" performing a specified function, or "step for" performing specified function, is not to be interpreted as a "means" or "step" clause as specified in 35 U.S.C. § 112, ¶6. In particular, any use of "step of" in the claims not intended to invoke the provision of 35 U.S.C. § 112, ¶6.

Furthermore, the Abstract is not intended to be limiting as to the scope of the claimed subject matter and is for the purpose of quickly determining the nature of the claimed subject matter.

What is claimed is:

1. A receiver comprising a circuit configured to process, based on a series of timed waveform reference locations, a waveform signal, the waveform signal comprising a message, wherein the circuit comprises:
   a clock source;
   an input configured to receive the waveform signal;
   a time location reference circuit coupled to the clock source, the time location reference circuit configured to output the series of timed waveform reference locations, each timed waveform reference location from the series of timed waveform reference locations being set by the clock source; and
   a signal processing circuit coupled to the time location reference circuit, the signal processing circuit configured to generate an output voltage in a response to the waveform signal being inputted into the signal processing circuit through the input and in a further response to the waveform signal being processed at the each timed waveform reference location from the series of timed waveform reference locations.

2. The receiver of claim 1, further comprising a comparator configured to compare the output voltage with a threshold voltage.

3. The receiver of claim 1, wherein the time location reference circuit comprises a field programmable gate array (FPGA).

4. The receiver of claim 1, wherein the time location reference circuit comprises a bit-counter and a decoder.

5. The receiver of claim 1, wherein the signal processing circuit comprises a plurality of voltage integrator circuits, each voltage integrator circuit from the plurality of voltage integrator circuits comprises a switch coupled to each of a respective timed waveform reference location and the input, a capacitor coupled to each of the switch and a ground to integrate at least one of a voltage and a current flowing through the switch from the input, and a diode.

6. The receiver of claim 5, wherein the switch is a metal oxide semiconductor field effect transistor (MOSFET), wherein the respective timed waveform reference location is coupled to a gate terminal on the MOSFET, wherein the capacitor is coupled to a source terminal on the MOSFET and wherein the input is coupled to a drain terminal on the MOSFET.

7. The receiver of claim 1, further comprising an amplifier disposed mediate the input and the signal processing circuit.

8. The receiver of claim 7, further comprising a capacitor disposed mediate the amplifier and the signal processing circuit, the capacitor blocking a voltage flowing back to the amplifier.

9. The receiver of claim 8, further comprising a resistor disposed mediate the capacitor and the signal processing circuit, the resistor limiting current flow into the capacitor.

10. The receiver of claim 9, further comprising a voltage bias circuit.

11. The receiver of claim 1, further comprising an indicator coupled to the signal processing circuit, the indicator being actuated when an output voltage is one of being equal to and exceeding a voltage required to actuate the indicator.

12. The receiver of claim 11, further comprising an amplifier disposed between the signal processing circuit and the indicator.

13. The receiver of claim 1, further comprising an antenna in a connection with the input, the antenna capturing the waveform signal transmitted through an atmospheric layer medium.

14. The receiver of claim 1, further comprising a cable in a connection with the input, the cable carrying the waveform signal originated at a remote device.

15. The receiver of claim 1, wherein the receiver configured to perform a form of a coherent integration at each timed waveform reference location respectively.

16. The receiver of claim 1, wherein the receiver configured to perform a form of a coherent integration and a form of non-coherent integration at each timed waveform reference location respectively.

17. The receiver of claim 1, wherein the circuit further comprises:
an amplifier disposed mediate the input and the signal processing circuit;
a capacitor disposed mediate the amplifier and the signal processing circuit, the capacitor blocking a current flow back to the amplifier;
a resistor disposed mediate the capacitor and the signal processing circuit, the resistor limiting the current flow into the capacitor; and
a voltage bias circuit.

18. The receiver of claim 1, wherein the clock source comprises a chip scale atomic clock (CSAC), a rubidium atomic clock, a hydrogen MASER clock, a cesium atomic clock, a global positioning system (GPS) derived clock or a GPS disciplined clock.

19. A receiver comprising a circuit configured to process, based on a series of timed waveform reference locations, a waveform signal, the waveform signal comprising a message, wherein the circuit comprises:
a clock source;
an input configured to receive the waveform signal;
a time location reference circuit coupled to the clock source, the time location reference circuit configured to output the series of timed waveform reference locations, each timed waveform reference location from the series of timed waveform reference locations being set by the clock source;
a first signal processing circuit coupled to the time location reference circuit, the first signal processing circuit configured to generate a first voltage in a response to the waveform signal being inputted into the first signal processing circuit through the input and in a further response to the waveform signal being processed at the each timed waveform reference location from the series of timed waveform reference locations; and
a second signal processing circuit coupled to the time location reference circuit, the second signal processing circuit configured to generate a second voltage in a response to the waveform signal being inputted into the second signal processing circuit through the input and in a further response to the waveform signal being processed at the each timed waveform reference location from the series of timed waveform reference locations.

20. The receiver of claim 19, further comprising:
a voltage subtractor circuit outputting a voltage difference between the first voltage and the second voltage; and
a comparator configured to compare the voltage difference with a threshold voltage.

21. The receiver of claim 20, further comprising a voltage integrator disposed between the voltage subtractor circuit and the comparator.

22. A receiver comprising a circuit configured to process, based on a series of timed waveform reference locations, a waveform signal, the waveform signal comprising a message, wherein the circuit comprises:
a clock source;
an input configured to receive the waveform signal;
a time location reference circuit coupled to the clock source, the time location reference circuit configured to output the series of timed waveform reference locations, each timed waveform reference location from the series of timed waveform reference locations being set by the clock source;
a first circuit coupled to the time location reference circuit, the first circuit configured to generate a plurality of voltages in a response to the waveform signal being inputted into the first circuit through the input and in a further response to the waveform signal being processed at each timed waveform reference location from the series of timed waveform reference locations; and
a second circuit coupled to the first circuit, the second circuit configured to convert each voltage from the plurality of voltages from an analog form into a digital form.

* * * * *